(12) United States Patent
Umezu et al.

(10) Patent No.: US 9,693,039 B2
(45) Date of Patent: Jun. 27, 2017

(54) HAND-HELD ELECTRONIC DEVICE

(75) Inventors: Ryuji Umezu, Kyoto (JP); Hideki Konno, Kyoto (JP); Kenichi Sugino, Kyoto (JP); Yusuke Akifusa, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 669 days.

(21) Appl. No.: 13/049,581

(22) Filed: Mar. 16, 2011

(65) Prior Publication Data

US 2011/0292033 A1    Dec. 1, 2011

(30) Foreign Application Priority Data

May 27, 2010  (JP) ................................ 2010-122077
Jun. 14, 2010  (JP) ................................ 2010-135534

(51) Int. Cl.
*G06T 15/00*    (2011.01)
*H04N 13/02*    (2006.01)
*G06F 1/16*     (2006.01)
*H04N 13/04*    (2006.01)

(52) U.S. Cl.
CPC ....... *H04N 13/0239* (2013.01); *G06F 1/1616* (2013.01); *G06F 1/1692* (2013.01); *H04N 13/04* (2013.01); *H04N 13/0402* (2013.01); *H04N 13/0454* (2013.01); *H04N 13/0497* (2013.01)

(58) Field of Classification Search
CPC ........... H04N 13/0022; H04N 13/0239; H04N 13/0409; H04M 1/00
USPC .................................... 345/419, 173; 348/47
See application file for complete search history.

(56) References Cited

U.S. PATENT DOCUMENTS

| | | | |
|---|---|---|---|
| 5,065,236 A | 11/1991 | Diner | |
| 5,119,189 A | 6/1992 | Iwamoto et al. | |
| 5,309,522 A | 5/1994 | Dye | |
| 5,510,832 A | 4/1996 | Garcia | |
| 5,682,171 A | 10/1997 | Yokoi | |
| 5,690,551 A | 11/1997 | Taki et al. | |
| 5,726,704 A | 3/1998 | Uomori | |
| 5,734,416 A | 3/1998 | Ito et al. | |
| 5,808,591 A | 9/1998 | Mantani | |
| 6,002,534 A * | 12/1999 | Ueyama | 359/824 |
| 6,005,607 A | 12/1999 | Uomori et al. | |
| 6,034,740 A | 3/2000 | Mitsui et al. | |
| 6,088,006 A | 7/2000 | Tabata | |
| 6,118,475 A | 9/2000 | Iijima et al. | |
| 6,163,337 A | 12/2000 | Azuma et al. | |
| 6,175,379 B1 * | 1/2001 | Uomori et al. | 348/47 |

(Continued)

FOREIGN PATENT DOCUMENTS

CN    1455613 A    11/2003
EP    0 563 737    10/1993

(Continued)

OTHER PUBLICATIONS

May 15, 2012 European Search Report for EP 11164284.9, 11 pages.

(Continued)

*Primary Examiner* — Weiming He
(74) *Attorney, Agent, or Firm* — Nixon & Vanderhye P.C.

(57) ABSTRACT

A hand-held electronic device (10) includes an upper housing (21) and a lower housing (11) which are foldable. An upper LCD (22) capable of displaying an image which is stereoscopically visible with naked eyes is provided on an inner side surface of the upper housing (21).

40 Claims, 17 Drawing Sheets

(56) References Cited

U.S. PATENT DOCUMENTS

| | | |
|---|---|---|
| 6,198,484 B1 | 3/2001 | Kameyama |
| 6,236,748 B1 | 5/2001 | Iijima et al. |
| 6,243,054 B1 | 6/2001 | DeLuca |
| 6,268,880 B1 | 7/2001 | Uomori et al. |
| 6,324,001 B2 | 11/2001 | Tabata |
| 6,369,952 B1 | 4/2002 | Rallison et al. |
| 6,384,859 B1 | 5/2002 | Matsumoto et al. |
| 6,389,179 B1 | 5/2002 | Katayama et al. |
| 6,518,939 B1 | 2/2003 | Kikuchi |
| 6,559,813 B1 | 5/2003 | DeLuca et al. |
| 6,614,927 B1 | 9/2003 | Tabata |
| 6,762,794 B1 | 7/2004 | Ogino |
| 7,027,664 B2 | 4/2006 | Lee et al. |
| 7,046,270 B2 | 5/2006 | Murata et al. |
| 7,295,697 B1 | 11/2007 | Satoh |
| 7,417,664 B2 | 8/2008 | Tomita |
| 7,557,824 B2 | 7/2009 | Holliman |
| D603,363 S | 11/2009 | Choi et al. |
| 7,786,997 B2 | 8/2010 | Yoshino et al. |
| 8,559,705 B2 | 10/2013 | Ng |
| 8,625,882 B2 * | 1/2014 | Backlund et al. ............ 382/154 |
| 2001/0030715 A1 | 10/2001 | Tabata |
| 2001/0033327 A1 | 10/2001 | Uomori et al. |
| 2001/0045979 A1 | 11/2001 | Matsumoto et al. |
| 2002/0030675 A1 | 3/2002 | Kawai |
| 2002/0126202 A1 | 9/2002 | Wood et al. |
| 2003/0107643 A1 | 6/2003 | Yoon |
| 2003/0179198 A1 | 9/2003 | Uchiyama |
| 2003/0203747 A1 * | 10/2003 | Nagamine ................. 455/575.3 |
| 2004/0058715 A1 | 3/2004 | Taniguchi et al. |
| 2004/0066555 A1 | 4/2004 | Nomura |
| 2004/0119699 A1 | 6/2004 | Jones et al. |
| 2004/0169919 A1 | 9/2004 | Uehara et al. |
| 2004/0214637 A1 | 10/2004 | Nonaka |
| 2005/0089212 A1 * | 4/2005 | Mashitani et al. ............ 382/154 |
| 2005/0174328 A1 | 8/2005 | Nishiumi et al. |
| 2005/0190180 A1 * | 9/2005 | Jin et al. ........ 345/419 |
| 2005/0237385 A1 | 10/2005 | Kasaka et al. |
| 2005/0253924 A1 | 11/2005 | Mashitani |
| 2005/0271303 A1 | 12/2005 | Simpson |
| 2005/0276071 A1 | 12/2005 | Sasagawa et al. |
| 2006/0073899 A1 | 4/2006 | Kasamatsu et al. |
| 2006/0126919 A1 | 6/2006 | Kitaura et al. |
| 2006/0152579 A1 | 7/2006 | Utsugi et al. |
| 2006/0203085 A1 | 9/2006 | Tomita |
| 2006/0227420 A1 | 10/2006 | Cha et al. |
| 2006/0258444 A1 | 11/2006 | Nogami et al. |
| 2007/0113228 A1 * | 5/2007 | Raghunath et al. .............. 718/1 |
| 2007/0171276 A1 | 7/2007 | Kim et al. |
| 2007/0202956 A1 | 8/2007 | Ogasawara et al. |
| 2007/0210749 A1 | 9/2007 | Hsieh |
| 2007/0223090 A1 | 9/2007 | Dolgoff |
| 2007/0223751 A1 | 9/2007 | Dickins et al. |
| 2007/0236493 A1 | 10/2007 | Horiuchi et al. |
| 2007/0242068 A1 | 10/2007 | Han et al. |
| 2008/0158346 A1 * | 7/2008 | Okamoto et al. ............... 348/47 |
| 2008/0204566 A1 | 8/2008 | Yamazaki et al. |
| 2008/0246757 A1 | 10/2008 | Ito |
| 2009/0051835 A1 | 2/2009 | Parks et al. |
| 2009/0059497 A1 | 3/2009 | Kuwahara et al. |
| 2009/0103833 A1 | 4/2009 | Mitsuhashi et al. |
| 2009/0160936 A1 * | 6/2009 | McCormack ................. 348/143 |
| 2009/0181733 A1 | 7/2009 | Demuycnk |
| 2009/0278764 A1 | 11/2009 | Kuwahara et al. |
| 2010/0111417 A1 | 5/2010 | Ward et al. |
| 2010/0283833 A1 | 11/2010 | Yeh |
| 2010/0289882 A1 | 11/2010 | Ohta |
| 2011/0018863 A1 * | 1/2011 | Ha ................. 345/419 |
| 2011/0032252 A1 | 2/2011 | Ohta |
| 2011/0090215 A1 | 4/2011 | Ohta |
| 2011/0102425 A1 | 5/2011 | Ohta |
| 2011/0228049 A1 * | 9/2011 | Kazakevich et al. ............ 348/45 |
| 2011/0242361 A1 | 10/2011 | Kuwahara et al. |
| 2012/0044249 A1 | 2/2012 | Mashitani et al. |
| 2012/0050502 A1 | 3/2012 | Chi et al. |
| 2012/0133641 A1 | 5/2012 | Umezu et al. |
| 2012/0133642 A1 | 5/2012 | Umezu et al. |
| 2012/0242807 A1 | 9/2012 | Umezu et al. |

FOREIGN PATENT DOCUMENTS

| | | | |
|---|---|---|---|
| EP | 0 712 110 | | 5/1996 |
| EP | 0 735 512 A2 | | 10/1996 |
| EP | 0 751 689 | | 1/1997 |
| EP | 0 817 125 | | 1/1998 |
| EP | 0 888 017 | | 12/1998 |
| EP | 1 085 769 | | 3/2001 |
| EP | 1 089 573 | | 4/2001 |
| EP | 1 168 852 | | 1/2002 |
| EP | 1 357 726 | | 10/2003 |
| EP | 1 408 703 | | 4/2004 |
| EP | 1 501 317 | | 1/2005 |
| EP | 1 571 854 | | 9/2005 |
| EP | 2 323 414 | | 5/2011 |
| EP | 2 355 526 | | 8/2011 |
| JP | 07-059119 | | 3/1995 |
| JP | 07-095621 | | 4/1995 |
| JP | 07-143524 | | 5/1995 |
| JP | 08-009421 | | 1/1996 |
| JP | 08-205201 | | 8/1996 |
| JP | 08-331607 | | 12/1996 |
| JP | 09-074573 | | 3/1997 |
| JP | 9-74573 | | 3/1997 |
| JP | 09-121370 | | 5/1997 |
| JP | 10-074269 | | 3/1998 |
| JP | 2000-020757 | | 1/2000 |
| JP | 2000-078615 | | 3/2000 |
| JP | 2001-022344 | | 1/2001 |
| JP | 2001-326948 | | 11/2001 |
| JP | 2001-330713 | | 11/2001 |
| JP | 2003-107603 | | 4/2003 |
| JP | 2003-319043 | | 11/2003 |
| JP | 2003-333624 | | 11/2003 |
| JP | 2004-007395 | | 1/2004 |
| JP | 2004-120059 | | 4/2004 |
| JP | 2004-126902 | | 4/2004 |
| JP | 2004-159014 | | 6/2004 |
| JP | 2004-519932 | | 7/2004 |
| JP | 2004-283303 | | 10/2004 |
| JP | 2004-294861 | | 10/2004 |
| JP | 2004-297540 | | 10/2004 |
| JP | 2005-020187 | | 1/2005 |
| JP | 2005-151162 | | 6/2005 |
| JP | 2005-165614 | | 6/2005 |
| JP | 2005-353047 | | 12/2005 |
| JP | 2006-33476 | | 2/2006 |
| JP | 2006-102210 | | 4/2006 |
| JP | 2006-314633 | | 11/2006 |
| JP | 2006-337785 | | 12/2006 |
| JP | 2007-044244 | | 2/2007 |
| JP | 2007-74629 | | 3/2007 |
| JP | 2007-206807 | | 8/2007 |
| JP | 2007-286623 | | 11/2007 |
| JP | 2008-287588 | | 11/2008 |
| JP | 2009-147863 | | 2/2009 |
| JP | 4260215 | | 2/2009 |
| JP | 2009-064356 | | 3/2009 |
| JP | 2009-171064 | | 7/2009 |
| JP | 2010-56737 | | 3/2010 |
| JP | 2010-226362 | | 10/2010 |
| WO | 01/84852 | | 11/2001 |
| WO | 02/073981 | | 9/2002 |
| WO | 2007/148434 | | 12/2007 |
| WO | WO 2010/007787 | * | 1/2010 ............ H04N 13/04 |
| WO | 2010/038296 A1 | | 4/2010 |

OTHER PUBLICATIONS

European Search Report for EP11164284.9, Jan. 20, 2012.

Only Upper Screen Is a 3D Display? A Part of the Specification Has Been Revealed in a Picture That Seems to Show a Test Board of 'Nintendo 3DS', Gigazine, May 20, 2010, with a partial English

(56) References Cited

OTHER PUBLICATIONS translation, 4 pages, http://gigazine.net/news/20100520_nintendo3ds_board/.

"This is 'Nintendo 3DS' . . . is it!? A prediction movie of 3DS is already open to the public", ITmedia Gamez, Mar. 29, 2010, with a partial English translation, 7 pages, with a partial English translation, http://gamez.itmedia.co.jp/games/articles/1003/29/news073.html.

"Notice of the beginning of the promotion service 'Mobile 3D' allowing us to enjoy the experience of 3D by three carriers of mobile phones in Japan", Dentu Tech Inc., New Releases, Feb. 15, 2010, 3 pages, with a partial English translation, http://www.dentsutec.co.jp/techp/news/2010/r0215.pdf.

Aug. 9, 2013 Search Report for EP 11786248.2, 15, pages.

Dec. 23, 2013 Office Action in U.S. Appl. No. 13/117,425, 26 pages.

Jan. 22, 2014 Office Action in U.S. Appl. No. 13/117,468, 21 pages.

Ohta, U.S. Appl. No. 12/779,421, filed May 13, 2010.

Ohta, U.S. Appl. No. 12/938,089, filed Nov. 2, 2010.

Ohta, U.S. Appl. No. 12/907,248, filed Oct. 19, 2010.

Ohta, U.S. Appl. No. 12/845,970, filed Jul. 29, 2010.

English-language machine translation of JP 2004-283303.

English-language machine translation of JP 2007-044244.

English-language machine translation of JP 2005-165614.

English-language machine translation of JP 09-074573.

English-language machine translation of JP 08-331607.

Office Action dated Apr. 10, 2014 issued in connection with U.S. Appl. No. 13/117,425, filed May 27, 2011.

Office Action issued in U.S. Appl. No. 13/117,468 dated Sep. 16, 2014.

Office Action issued in U.S. Appl. No. 13/500,048 dated Oct. 2, 2014.

Oral Proceedings European Application No. 11164284.9 dated Nov. 5, 2014.

Oral Proceedings European Application No. 11154284.9 dated Nov. 5, 2014.

Office Action issued in U.S. Appl. No. 13/500,048 dated May 5, 2016.

* cited by examiner

F I G. 4
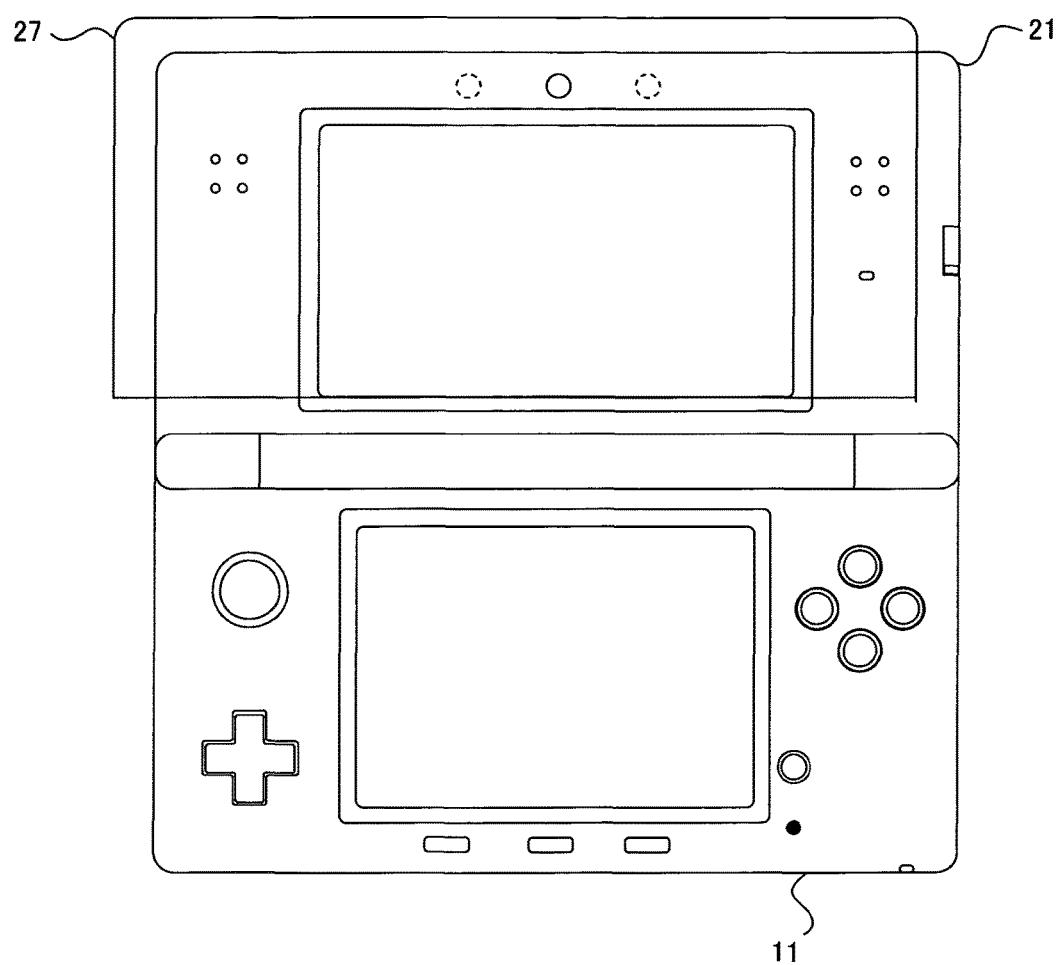

(THIRD POSITION)

(FIRST POSITION)

F I G. 8
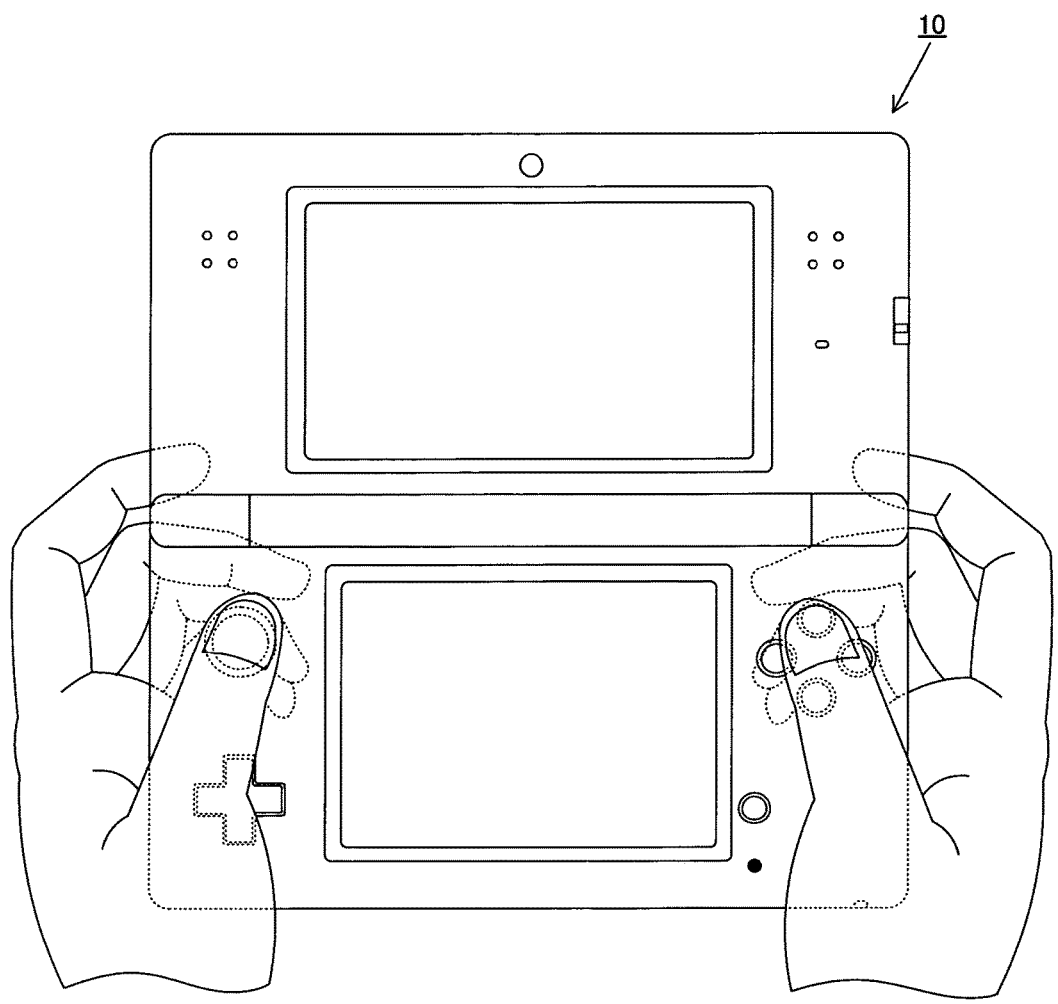

HAND-HELD ELECTRONIC DEVICE

CROSS REFERENCE TO RELATED APPLICATION

The disclosure of Japanese Patent Application No. 2010-135534, filed on Jun. 14, 2010, and the disclosure of Japanese Patent Application No. 2010-122077, filed on May 27, 2010, are incorporated herein by reference.

FIELD

The present invention relates to hand-held electronic devices. More particularly, the invention relates to hand-held electronic devices each having a stereoscopic display section for displaying an image which is stereoscopically visible with naked eyes.

BACKGROUND AND SUMMARY

In recent years, hand-held electronic devices each having a stereoscopic display section for displaying an image which is stereoscopically visible with naked eyes have been proposed. For example, Japanese Laid-Open Patent Publication No. 2010-56737 (Patent Document 1) discloses an electronic device provided with a compound-eye camera having two imaging sensors. In this electronic device, two images taken by the compound-eye camera at the time of shooting are synthesized to create an image for three-dimensional display, and the image is three-dimensionally displayed on a monitor.

However, the electronic device disclosed in Patent Document 1 is constituted by a single housing, and has poor viewability in stereoscopic viewing with naked eyes.

Therefore, an object of the present invention is to provide a hand-held electronic device in which viewability in stereoscopic viewing with naked eyes is improved.

The present invention has the following features to attain the object mentioned above.

In a hand-held electronic device according to the present invention, a first housing and a second housing are configured so as to be foldable. The first housing is provided with a stereoscopic display section capable of displaying an image which is stereoscopically visible with naked eyes.

The stereoscopic display section capable of displaying an image which is stereoscopically visible with naked eyes is limited with respect to its suitable view point. In the present invention, since the angle of the first housing is adjustable, viewability in stereoscopic viewing is excellent. Further, in the stereoscopic display section, contamination such as fingerprint on the screen thereof significantly deteriorates the stereoscopic effect of 3D display. In the present invention, however, since a user holds the second housing, the possibility of user's touching the stereoscopic display section is reduced.

In the present invention, the second housing may be provided with an operation section.

Accordingly, the angle of the stereoscopic display section can be adjusted so that the user can easily view the same while adjusting the angle of the operation section on the second housing so that the user can easily operate the same.

In the present invention, the first housing may be provided with a pair of imaging sections capable of stereoscopic shooting.

Accordingly, the direction of stereoscopic shooting can be varied by adjusting the angle of the first housing.

In the present invention, the pair of imaging sections may be arranged so as to be horizontally symmetrical with respect to a center of a screen of the stereoscopic display section.

In the present invention, the first housing may be provided with three imaging sections.

In the present invention, two of the three imaging sections may be arranged so as to be horizontally symmetrical with respect to the center of the screen of the stereoscopic display section.

In the present invention, one of the three imaging sections may be aligned with the center of the screen of the stereoscopic display section in the horizontal direction.

In the present invention, the three imaging sections may be aligned along the horizontal direction of the stereoscopic display section.

In the present invention, the three imaging sections may be assembled as a single unit, and the unit may be housed in a storage section in the first housing.

In the present invention, the three imaging sections may be arranged so that the imaging directions of two of the three imaging sections are in the same direction, and the imaging direction of the other one imaging section may be reverse to the direction.

In the present invention, two of the three imaging sections may enable stereoscopic shooting, and the stereoscopic display section may display a stereoscopic image by using images taken by and outputted from the two imaging sections.

In the present invention, the second housing may be provided with a shutter button for stereoscopic shooting.

In the present invention, the shutter button for stereoscopic shooting may be provided on both ends of an upper surface of the second housing.

In the present invention, the first housing may be provided with a parallax adjusting operation section for adjusting a parallax in the stereoscopic display section.

In the present invention, the first housing may include, as an operation section, only the parallax adjusting operation section.

In the present invention, the second housing may be provided with an analog direction switch.

In the present invention, the second housing may be provided with a touch panel.

In the present invention, the second housing may be provided with a touch screen.

In the present invention, the stereoscopic display section need not be provided with a touch panel function.

In the present invention, the size of the screen of the stereoscopic display section may be greater than the size of the touch screen.

In the present invention, an operation section may be provided to the right and the left of the touch screen in the second housing, respectively.

In the present invention, an operation section may be provided on an upper side surface of the second housing.

In the present invention, an operation section may be provided on both ends of an upper side surface of the second housing.

In the present invention, the first housing may be provided with a light-emitting section for stereoscopic display, which indicates a display mode of the stereoscopic display section.

In the present invention, the first housing may include, as a light-emitting section, only the light-emitting section for stereoscopic display.

In the present invention, the second housing may be provided with a light-emitting section for a power supply, which indicates the state of the power supply.

In the present invention, the second housing may be provided with a light-emitting section for wireless communication, which indicates the state of wireless communication.

In the present invention, the first housing and the second housing each have a horizontally long shape, and are connected to each other at long side portions thereof. The stereoscopic display section has a horizontally long screen, and a long side portion of the screen is arranged along the long side portion of the first housing.

According to the present invention, it is possible to improve viewability of an image displayed on the stereoscopic display section capable of displaying an image which is stereoscopically visible with naked eyes.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an exploded view illustrating a state in which a screen cover 27 is removed from an inner side surface of an upper housing 21;

FIG. 8 is a diagram illustrating a state in which a user holds the game apparatus 10 with both hands;

DESCRIPTION OF THE PREFERRED EMBODIMENTS (Structure of Game Apparatus)

Figure 1:
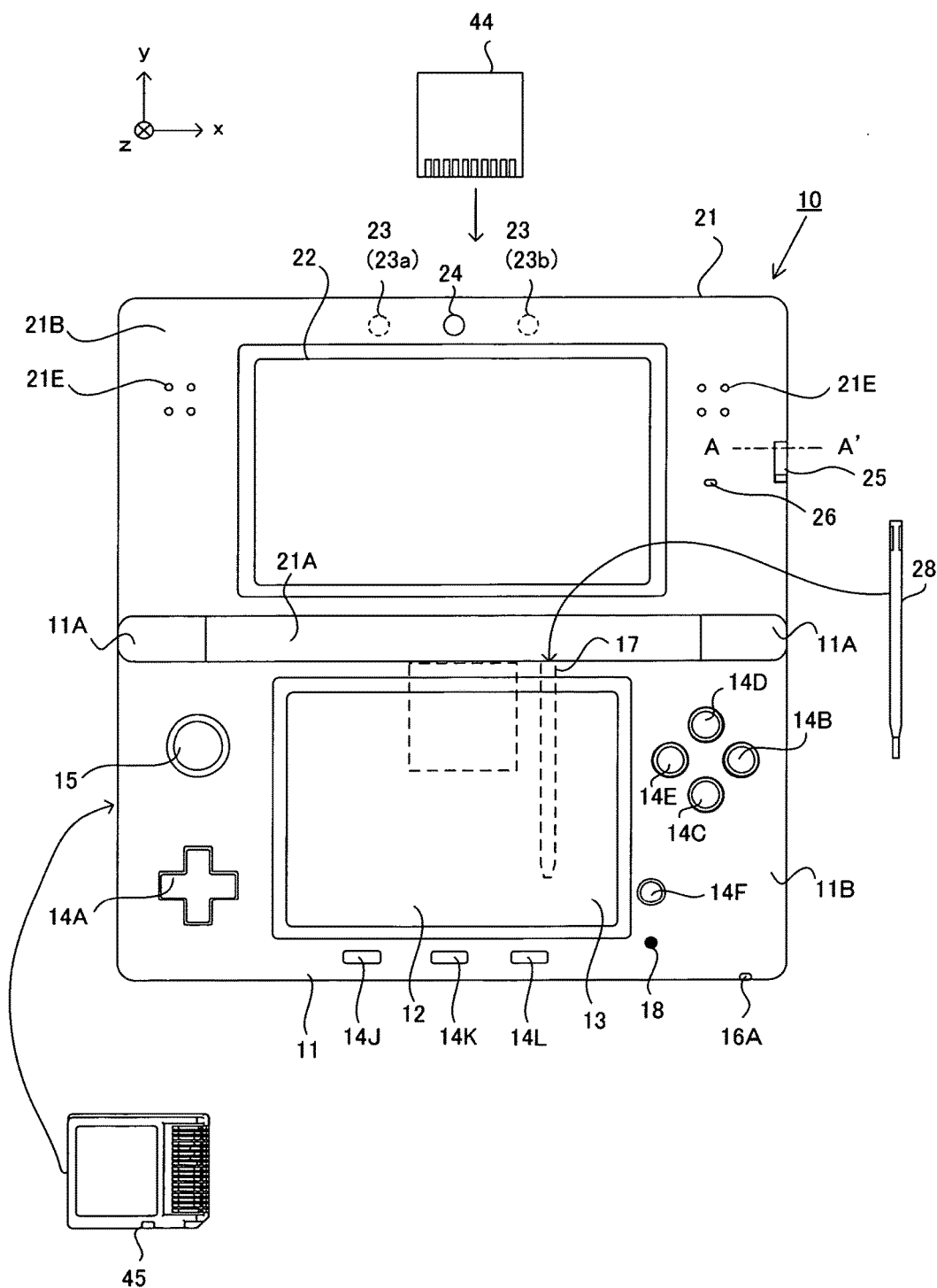
FIG. 1 is a front view of a game apparatus 10 in its opened state.
Figure 2:
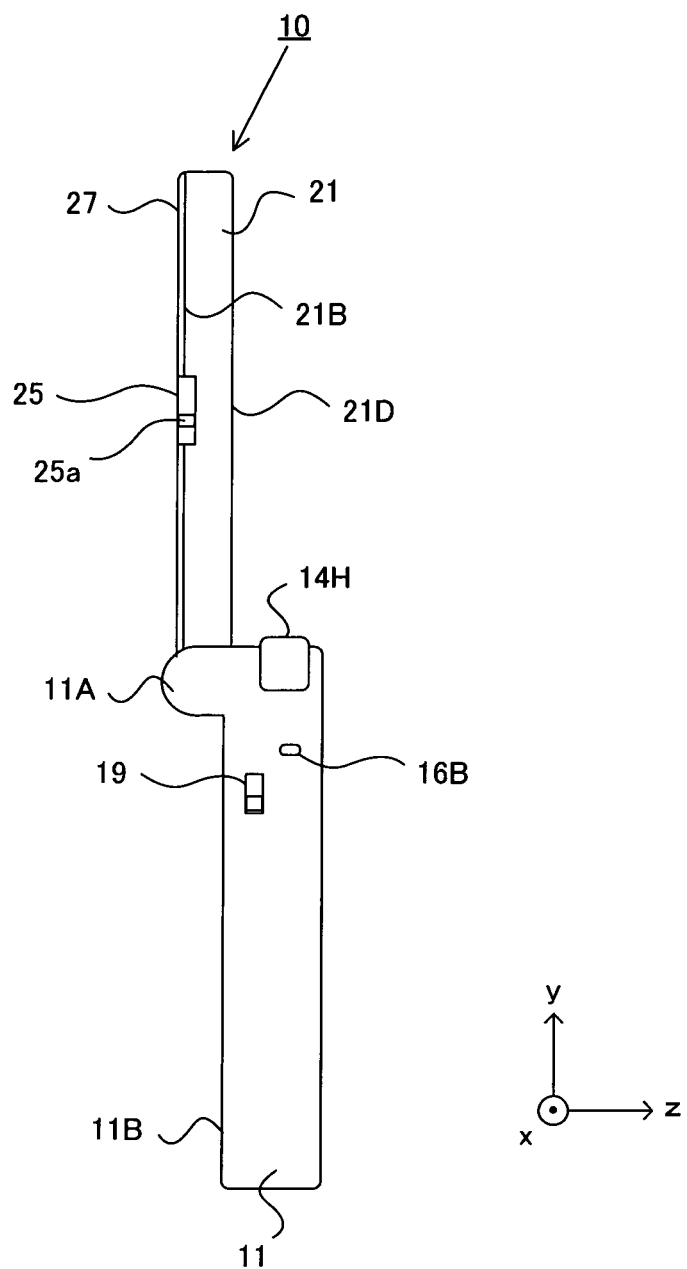
FIG. 2 is a right side view of the game apparatus 10 in its opened state.
Figure 3:
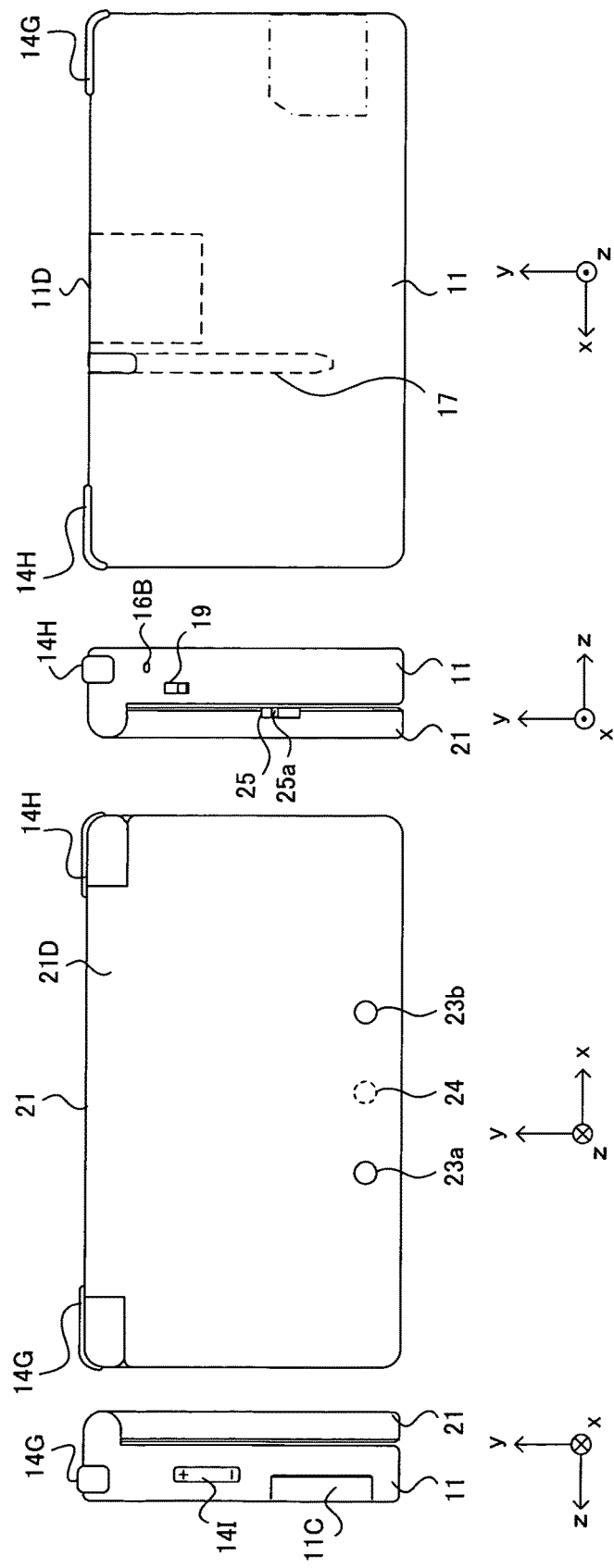
FIG. 3A is a left side view of the game apparatus 10 in its closed state.
FIG. 3B is a front view of the game apparatus 10 in its closed state.
FIG. 3C is a right side view of the game apparatus 10 in its closed state.
FIG. 3D is a rear view of the game apparatus 10 in its closed state.

Hereinafter, a game apparatus as according to one embodiment of the present invention will be described. FIG. 1 to FIG. 3D are each a plan view of an outer appearance of a game apparatus 10. The game apparatus 10 is a hand-held game apparatus, and is configured to be foldable as shown in FIG. 1 to FIG. 3D. FIG. 1 and FIG. 2 show the game apparatus 10 in an opened state, and FIGS. 3A to 3D show the game apparatus 10 in a closed state. FIG. 1 is a front view of the game apparatus 10 in the opened state, and FIG. 2 is a right side view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 3D. The game apparatus 10 includes a lower housing 11 and an upper housing 21 as shown in FIG. 1 to FIG. 3D. The lower housing 11 and the upper housing 21 are connected to each other so as to be openable and closable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIG. 1 and FIG. 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIG. 1 to FIG. 3D, in the lower housing 11, a lower LCD (Liquid Crystal Display) 12, a touch panel 13, operation buttons 14A to 14L (FIG. 1, FIG. 3B), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 sandwich the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 7) is provided as a sound input device described below, and the microphone detects for a sound from the outside of the game apparatus 10.

FIG. 3A is a left side view of the game apparatus 10 in the closed state. FIG. 3B is a front view of the game apparatus 10 in the closed state. FIG. 3C is a right side view of the game apparatus 10 in the closed state. FIG. 3D is a rear view of the game apparatus 10 in the closed state. As shown in FIG. 3B and FIG. 3D, an L button 14G and an R button 14H are provided on the upper side surface of the lower housing 11. The L button 14G is positioned on the left end portion of the upper side surface of the lower housing 11 and the R button 14H is positioned on the right end portion of the upper side surface of the lower housing 11. As described below, the L button 14G and the R button 14H act as shutter buttons (imaging instruction buttons) of the imaging section. Further, as shown in FIG. 3A, a sound volume button 14I is provided on the left side surface of the lower housing 11. The sound volume button 14I is used for adjusting a sound volume of a speaker of the game apparatus 10.

As shown in FIG. 3A, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C may be provided on the right side surface of the lower housing 11.

Further, as shown in FIG. 3D, an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, as shown in FIG. 1 and FIG. 3C, a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 3D, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

The screen of the upper LCD 22 is provided on the inner side surface (main surface) 21B of the upper housing 21, and the screen of the upper LCD 22 is exposed at an opening of the upper housing 21. Further, as shown in FIG. 2 and FIG. 4, the inner side surface of the upper housing 21 is covered with a transparent screen cover 27. FIG. 4 is an exploded view illustrating a state in which the screen cover 27 is removed from the inner side surface of the upper housing 21. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, a left-eye image and a right-eye image are displayed by using substantially the same display area. Specifically, the upper LCD 22 may be a display device using a method in which the left-eye image and the right-eye image are alternately displayed in the horizontal direction in predetermined units (for example, every other line). Alternatively, a display device using a method in which the left-eye image and the right-eye image are alternately displayed may be used. Further, in the present embodiment, the upper LCD 22 is a display device capable of displaying an image which is stereoscopically visible with naked eyes. A lenticular lens type display device or a parallax barrier type display device is used which enables the left-eye image and the right-eye image, which are alternately displayed in the horizontal direction, to be separately viewed by the left eye and the right eye, respectively. In the present embodiment, the upper LCD 22 of a parallax barrier type is used. The upper LCD 22 displays, by using the right-eye image and the left-eye image, an image (a stereoscopic image) which is stereoscopically visible with naked eyes. That is, the upper LCD 22 allows a user to view the left-eye image with her/his left eye, and the right-eye image with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23a and the imaging direction of the outer imaging section (right) 23b are parallel to each other. The outer imaging section (left) 23a and the outer imaging section (right) 23b can be used as a stereo camera depending on a program executed by the game apparatus 10. Further, depending on a program, when any one of the two outer imaging sections (23a and 23b) is used alone, the outer imaging section 23 may be used as a non-stereo camera. Further, depending on a program, images taken by the two outer imaging sections (23a and 23b) may be combined with each other or may compensate for each other, thereby enabling imaging using an extended imaging range. In the present embodiment, the outer imaging section 23 is structured so as to include two imaging sections, that is, the outer imaging section (left) 23a and the outer imaging section (right) 23b. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3B, the outer imaging section (left) 23a and the outer imaging section (right) 23b forming the outer imaging section 23 are aligned so as to be parallel to the horizontal direction of the screen of the upper LCD 22. Specifically, the outer imaging section (left) 23a and the outer imaging section (right) 23b are positioned such that a straight line connecting between the two imaging sections is parallel to the horizontal direction of the screen of the upper LCD 22. Reference numerals 23a and 23b which are indicated as dashed lines in FIG. 1 represent the outer imaging section (left) 23a and the outer imaging section (right) 23b, respectively, which are positioned on the outer side surface reverse of the inner side surface of the upper housing 21. As shown in FIG. 1, when a user views the screen of the upper LCD 22 from the front thereof, the outer imaging section (left) 23a is positioned to the left of the upper LCD 22 and the outer imaging section (right) 23b is positioned to the right of the upper LCD 22. When a program for causing the outer imaging section 23 to function as a stereo camera is executed, the outer imaging section (left) 23a takes a left-eye image, which is viewed by a left eye of a user, and the outer imaging section (right) 23b takes a right-eye image, which is viewed by a right eye of the user. A distance between the outer imaging section (left) 23a and the outer imaging section (right) 23b is set so as to be approximately the same as a distance between both eyes of a person, that is, may be set so as to be within a range from 30 mm to 70 mm, for example. However, the distance between the outer imaging section (left) 23a and the outer imaging section (right) 23b is not limited to a distance within the range described above.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left) 23a and the outer imaging section (right) 23b are positioned so as to be symmetrical with respect to a line which divides the upper LCD 22 into two equal parts, that is, the left part and the right part. Further, the outer imaging section (left) 23a and the outer imaging section (right) 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23a and the outer imaging section (right) 23b are positioned, on the outer side surface of the upper housing 21, at a position above the upper edge of the screen of the upper LCD 22 having been projected.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3B, the inner imaging section 24 is positioned on the inner side surface of the upper housing 21 at a position reverse of the middle position between the left and the right imaging sections (the outer imaging section (left) 23a and the outer imaging section (right) 23b) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3B represents the inner imaging section 24 positioned on the inner side surface of the upper housing 21.

As described above, the inner imaging section 24 is used for taking an image in the direction opposite to that of the outer imaging section 23. The inner imaging section 24 is positioned on the inner side surface of the upper housing 21 at a position reverse of the middle position between the left and the right imaging sections of the outer imaging section 23. Thus, when a user views the upper LCD 22 from the front thereof, the inner imaging section 24 can take an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1 to FIG. 3D, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. Further, an operation section of the 3D adjustment switch 25 projects on the inner side surface and the right side surface, and can be viewed and operated from both sides. All the switches other than the 3D adjustment switch 25 are provided on the lower housing 11.

Figure 5:
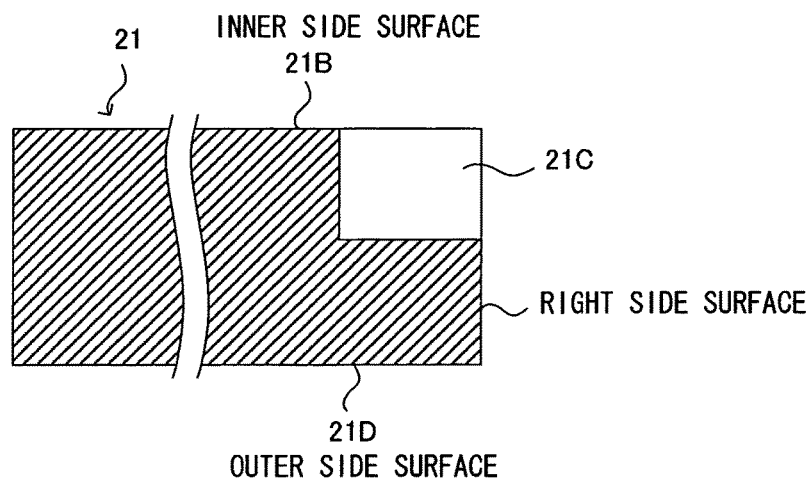
FIG. 5 is a cross-sectional view of an upper housing 21 shown in FIG. 1 taken along a line A-A'.

FIG. 5 is a cross-sectional view of the upper housing 21 shown in FIG. 1 taken along a line A-A'. As shown in FIG. 5, a recessed portion 21C is formed at the right end portion of the inner side surface of the upper housing 21, and the 3D adjustment switch 25 is provided in the recessed portion 21C. The 3D adjustment switch 25 is provided so as to be visible from the front surface and the right side surface of the upper housing 21 as shown in FIG. 1 and FIG. 2. A slider 25a of the 3D adjustment switch 25 is slidable to any position in a predetermined direction (along the longitudinal direction of the right side surface), and a display mode of the upper LCD 22 is determined in accordance with the position of the slider 25a.

Figure 6A:
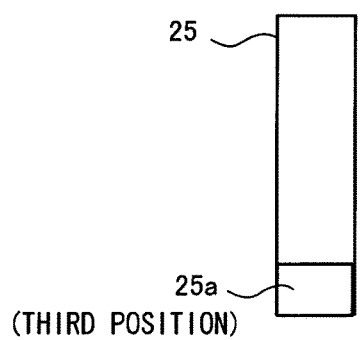
FIG. 6A is a diagram illustrating a state in which a slider 25a of a 3D adjustment switch 25 is positioned at the lowermost position (a third position)
Figure 6B:
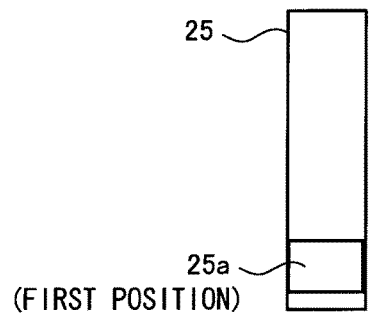
FIG. 6B is a diagram illustrating a state in which the slider 25a of the 3D adjustment switch 25 is positioned above the lowermost position (a first position)
Figure 6C:
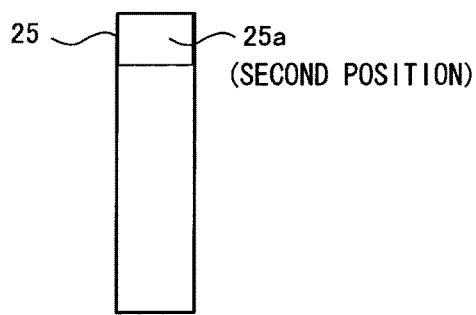
FIG. 6C is a diagram illustrating a state in which the slider 25a of the 3D adjustment switch 25 is positioned at the uppermost position (a second position)

FIG. 6A to FIG. 6C are each a diagram illustrating a state in which the slider 25a of the 3D adjustment switch 25 slides. FIG. 6A is a diagram illustrating a state in which the slider 25a of the 3D adjustment switch 25 is positioned at the lowermost position (a third position). FIG. 6B is a diagram illustrating a state in which the slider 25a of the 3D adjustment switch 25 is positioned above the lowermost position (a first position). FIG. 6C is a diagram illustrating a state in which the slider 25a of the 3D adjustment switch 25 is positioned at the uppermost position (a second position).

As shown in FIG. 6A, when the slider 25a of the 3D adjustment switch 25 is positioned at the lowermost position (the third position), the upper LCD 22 is set to the planar display mode, and a planar image is displayed on the screen of the upper LCD 22 (the upper LCD 22 may remain set to the stereoscopic display mode, and the same image may be used for the left-eye image and the right-eye image, to perform planar display). On the other hand, when the slider 25a is positioned between a position shown in FIG. 6B (a position (first position) above the lowermost position) and a position shown in FIG. 6C (the uppermost position (the second position)), the upper LCD 22 is set to the stereoscopic display mode. In this case, a stereoscopically visible image is displayed on the screen of the upper LCD 22. When the slider 25a is positioned between the first position and the second position, a manner in which the stereoscopic image is visible is adjusted in accordance with the position of the slider 25a. Specifically, an amount of shift in the horizontal direction between a position of a right-eye image and a position of a left-eye image is adjusted in accordance with the position of the slider 25a. An adjustment for a manner in which a stereoscopic image is visible in the stereoscopic display mode will be described below. The slider 25a of the 3D adjustment switch 25 is configured so as to be fixed at the third position, and is slidable, along the longitudinal direction of the right side surface, to any position between the first position and the second position. For example, the slider 25a is fixed at the third position by a projection (not shown) which projects, from the side surface of the 3D adjustment switch 25, in the lateral direction shown in FIG. 6A, and does not slide upward from the third position unless a predetermined force or a force greater than the predetermined force is applied upward. When the slider 25a is positioned between the third position and the first position, the manner in which the stereoscopic image is visible is not adjusted, which is intended as a margin. In another embodiment, the third position and the first position may be the same position, and, in this case, no margin is provided. Further, the third position may be provided between the first position and the second position. In this case, a direction in which an amount of shift in the horizontal direction between a position of a right-eye image and a position of a left-eye image is adjusted when the slider is moved from the third position toward the first position, is opposite to a direction in which an amount of shift in the horizontal direction between the position of the right-eye image and the position of the left-eye image is adjusted when the slider is moved from the third position toward the second position.

The program executed by the game apparatus according to the present embodiment includes a program for displaying a stereoscopic photograph, and a program for displaying a stereoscopic CG image. The program for displaying a stereoscopic CG image is used for taking an image of a virtual space by means of a virtual camera for a left eye and a virtual camera for a right eye to generate an left-eye image and an right-eye image. The game apparatus according to the present embodiment adjusts the stereoscopic effect by changing a distance between the two virtual cameras in accordance with the position of the slider 25a of the 3D adjustment switch 25 when executing such a program.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed (namely, image processing in which a left-eye image is different from a right-eye image is performed in the case of the 3D adjustment switch being positioned between the first position and the second position) in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 described below.

(Internal Configuration of Game Apparatus 10)

Figure 7:
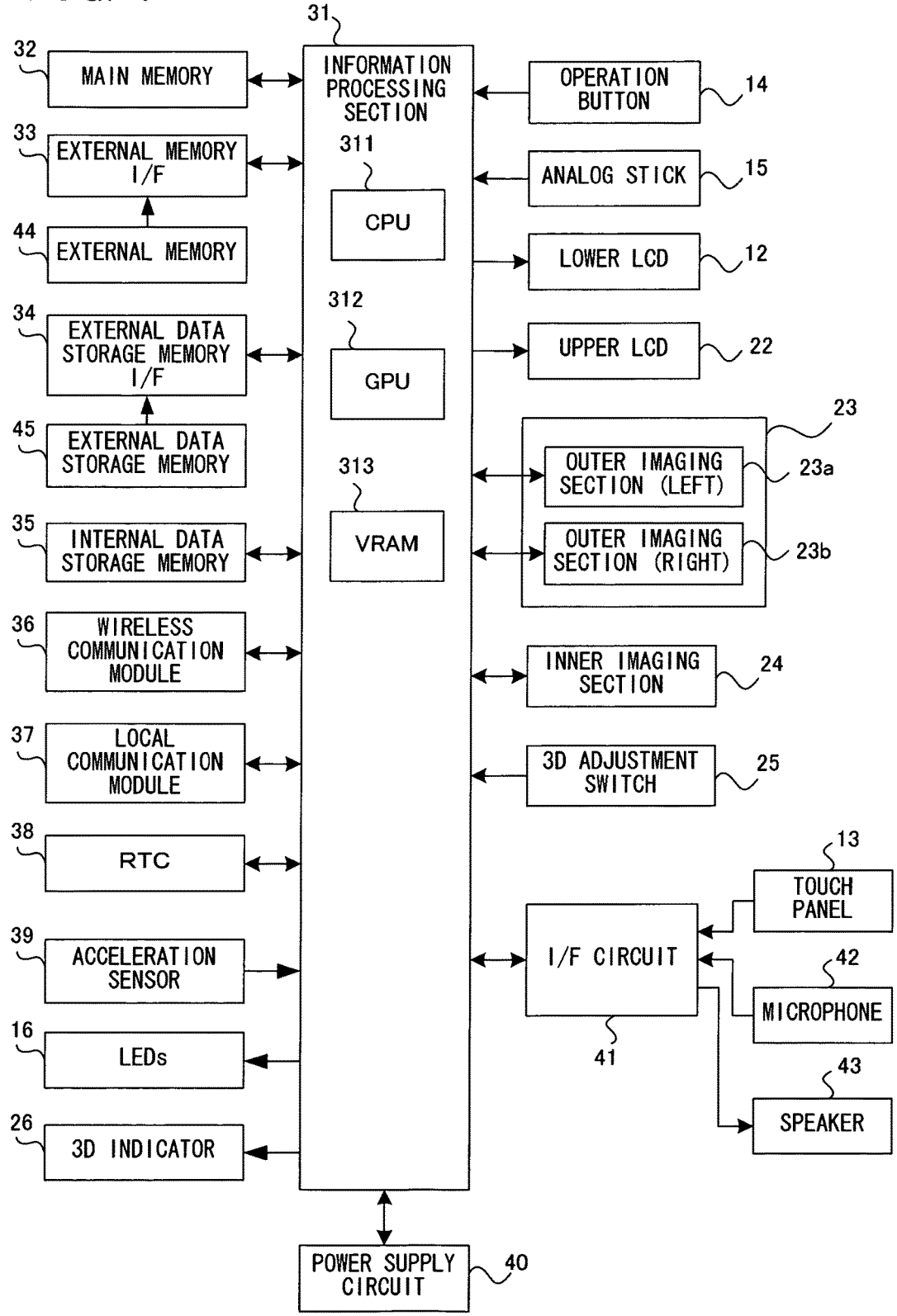
FIG. 7 is a block diagram illustrating an internal configuration of the game apparatus 10.

Next, an internal electrical configuration of the game apparatus 10 will be described with reference to FIG. 7. FIG.

7 is a block diagram illustrating an internal configuration of the game apparatus 10. As shown in FIG. 7, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a predetermined program is stored in a memory (for example, the external memory 44 connected to the external memory I/F 33 or the internal data storage memory 35) inside the game apparatus 10. The CPU 311 of the information processing section 31 executes a shooting process (FIG. 12) described below by executing the predetermined program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the shooting process, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10. In the present embodiment, the information processing section 31 determines an orientation (inclination) of the game apparatus 10 based on the acceleration detected by the acceleration sensor 39.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the lower LCD 12 to display an image for operation, and causes the upper LCD 22 to display an image acquired from one of the imaging sections 23 or 24. That is, the information processing section 31 causes the upper LCD 22 to display a stereoscopic image (stereoscopically visible image) using a right-eye image and a left-eye image which are taken by the outer imaging section 23, and causes the upper LCD 22 to display a planar image taken by the inner imaging section 24, for example.

Specifically, the information processing section 31 is connected to an LCD controller (not shown) of the upper LCD 22, and causes the LCD controller to set the parallax barrier to ON or OFF. When the parallax barrier is set to ON in the upper LCD 22, a right-eye image and a left-eye image, (taken by the outer imaging section 23), which are stored in the VRAM 313 of the information processing section 31 are outputted to the upper LCD 22. More specifically, the LCD controller alternately repeats reading of pixel data of the right-eye image for one line in the vertical direction, and reading of pixel data of the left-eye image for one line in the vertical direction, thereby reading, from the VRAM 313, the right-eye image and the left-eye image. Thus, an image to be displayed is divided into the images for a right eye and the images for a left eye each of which is a rectangle-shaped image having one line of pixels aligned in the vertical direction, and an image, in which the rectangle-shaped left-eye image which is obtained through the division, and the rectangle-shaped right-eye image which is obtained through the division are alternately aligned, is displayed on the screen of the upper LCD 22. A user views the images through the parallax barrier in the upper LCD 22, so that the right-eye image is viewed by the user's right eye, and the left-eye image is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31. In the present embodiment, the information processing section 31 issues an instruction for taking an image to one of the outer imaging section 23 or the inner imaging section 24, and the imaging section which receives the instruction for taking an image takes an image and transmits data of the taken image to the information processing section 31. Specifically, in the present embodiment, a user selects the imaging section to be used through a touch operation using the touch panel 13. When the information processing section 31 (the CPU 311) detects that the imaging section is selected, the information processing section 31 instructs one of the outer imaging section 32 or the inner imaging section 24 to take an image.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. In the present embodiment, the information processing section 31 lights up the 3D indicator 26 when the upper LCD 22 is in the stereoscopic display mode. The game apparatus 10 has the internal configuration as described above.

Figure 9:
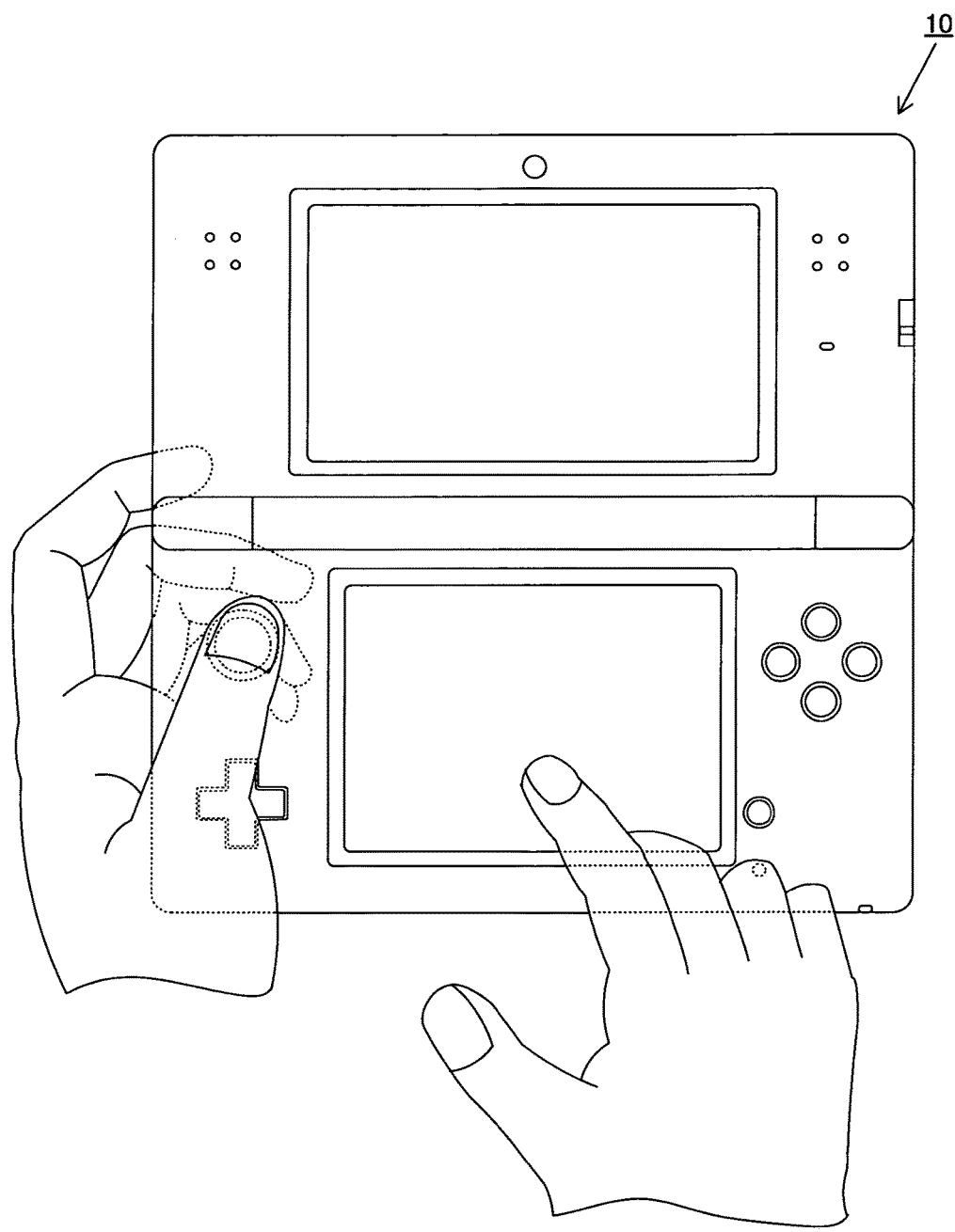
FIG. 9 is a diagram illustrating a state in which a user holds the game apparatus 10 with one hand.

Next, an example of usage state of the game apparatus 10 will be described with reference to FIGS. 8 to 11. FIG. 8 shows a state where a user holds the game apparatus 10 with both hands. As shown in FIG. 8, the user holds the side surfaces and the outer side surface (the surface reverse of the inner side surface) of the lower housing 11 with his/her palms, middle fingers, ring fingers, and little fingers so that the lower LCD 12 and the upper LCD 22 faces the user. Thereby, the user, holding the lower housing 11, is allowed to perform operations on the respective operation buttons 14A to 14E and the analog stick 15 with his/her thumbs, and operations on the L button 14G and the R button 14H with his/her index fingers. FIG. 9 shows a state where the user holds the game apparatus 10 with one hand. When performing an input on the touch panel 13, the user releases one hand from the lower housing 11 and holds the lower housing 11 with the other hand, so that the user can perform an input on the touch panel 13 with the one hand.

Figure 10:
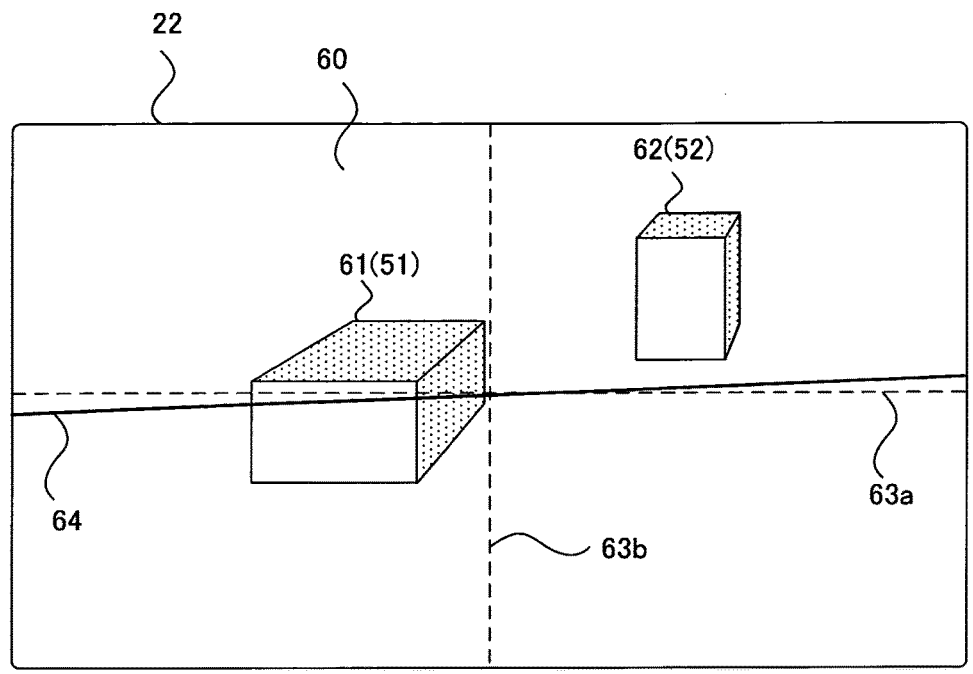
FIG. 10 is a diagram illustrating an example of an image displayed on a screen of an upper LCD 22.

FIG. 10 shows an example of an image displayed on the screen of the upper LCD 22. When the user selects the outer imaging section 23 and holds the game apparatus 10 in the state shown in FIG. 8, a right-eye image and a left-eye image taken by the outer imaging section 23 are displayed in real time on the screen of the upper LCD 22. As shown in FIG. 10, a stereoscopic image 60 includes a taken target image 61 obtained by taking an image of an imaging target 51 existing in the space, and a taken target image 62 obtaining by taking an image of an imaging target 52 existing in the space. The stereoscopic image 60 is an image stereoscopically viewed by the user. For example, the taken target image 61 and the taken target image 62 are viewed as if protruding from the screen of the upper LCD 22 toward the user. On the screen of the upper LCD 22, reference lines 63 (a horizontal reference line 63a and a vertical reference line 63b) represented by dashed lines and a level line 64 indicating an inclination of the game apparatus 10 are superimposed on the stereoscopic image 60. The horizontal reference line 63a equally divides the screen of the upper LCD 22 into upper and lower parts. The horizontal reference line 63a does not exist in the real space. The vertical reference line 63b equally divides the screen of the upper LCD 22 into right and left parts. The vertical reference line 63b does not exist in the real space. The level line 64 indicates an inclination of the game apparatus 10 relative to the horizontal direction. The level line 64 does not exist in the real space. Inclination of the game apparatus 10 relative to the horizontal direction is calculated based on an acceleration detected by the acceleration sensor 39. The level line 64 is displayed on the screen so that it is inclined according to the calculated inclination of the game apparatus 10 relative to the horizontal direction. That is, the level line 64 is a line vertical to the gravity direction detected by the acceleration sensor 39, and the level line 64 coincides with the horizontal reference line 63a when the game apparatus 10 is not inclined. In the example shown in FIG. 10, since the level line 64 is inclined to the left relative to the horizontal reference line 63a, the user can recognize that the game apparatus 10 is inclined to the left. By performing shooting with reference to the level line 64, the user can shoot the imaging target horizontally.

Figure 11:
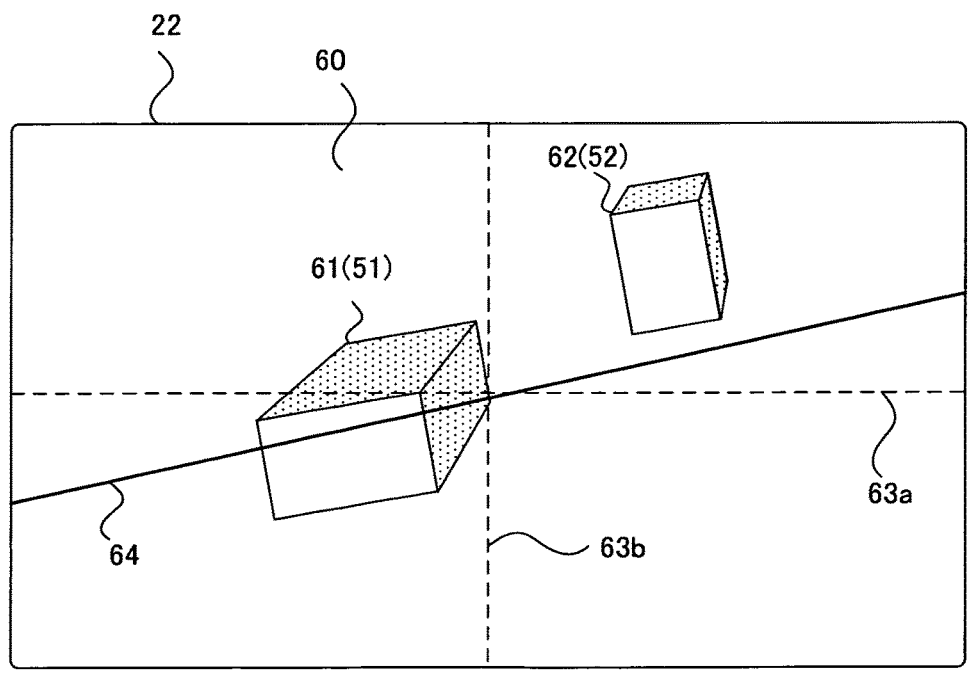
FIG. 11 is a diagram illustrating a state in which an image is taken with the game apparatus 10 being significantly inclined relative to the horizontal direction.

Since the level line 64 indicating inclination of the game apparatus 10 relative to the horizontal direction is displayed on the screen of the upper LCD 22, the user can easily determine whether or not the game apparatus 10 is inclined relative to the horizontal direction. If a stereoscopic image is taken and saved (shot) with the game apparatus 10 being inclined relative to the horizontal direction, a right-eye image and a left-eye image taken by the outer imaging section 23 are saved in such a manner that each image is rotated about its center. FIG. 11 shows a state where an image is shot with the game apparatus 10 being significantly inclined relative to the horizontal direction. As shown in FIG. 11, if an image is shot with the game apparatus 10 being significantly inclined to the left, a right-eye image and a left-eye image are shot (saved) in such a manner that each image is significantly rotated about its center. When the saved right-eye image and left-eye image are displayed on the upper LCD 22, a rotated stereoscopic image 60 is displayed as shown in FIG. 11. In this case, if the user rotates the game apparatus 10 in the direction reverse to the rotation direction of the stereoscopic image 60 in order to resolve the inclination of the stereoscopic image 60, the user cannot view the stereoscopic image 60 stereoscopically. The reason is as follows. When the user horizontally holds the upper LCD 22 and views the screen of the upper LCD 22 from the front thereof, the right-eye image is viewed by the user's right eye and the left-eye image is viewed by the user's left eye through the parallax barrier of the upper LCD 22. That is, the parallax barrier is formed in the vertical direction of the upper LCD 22, and the parallax barrier shields the left-eye image from the position of the user's right eye and the right-eye image from the position of the user's left eye. As a result, the right-eye image is viewed by the user's right eye, and the left-eye image is viewed by the user's left eye. On the other hand, when the upper LCD 22 is inclined relative to the horizontal direction, the parallax barrier is also inclined. Therefore, an image in which a part of the right-eye image and a part of the left-eye image are mixed is viewed by each of the user's eyes. Accordingly, the user cannot recognize the image stereoscopically. In the present embodiment, however, since the level line 64 indicating inclination (orientation) of the game apparatus 10 is displayed at the time of shooting, the user can easily recognize whether or not the game apparatus 10 is inclined. Thus, the user can shoot an image with the game apparatus 10 not being inclined relative to the horizontal direction. The level line 64 may be parallel to the gravity direction. In this case, when the game apparatus 10 is not inclined, the level line 64 coincides with the vertical reference line 63b.

(Details of Shooting Process)

Figure 12:
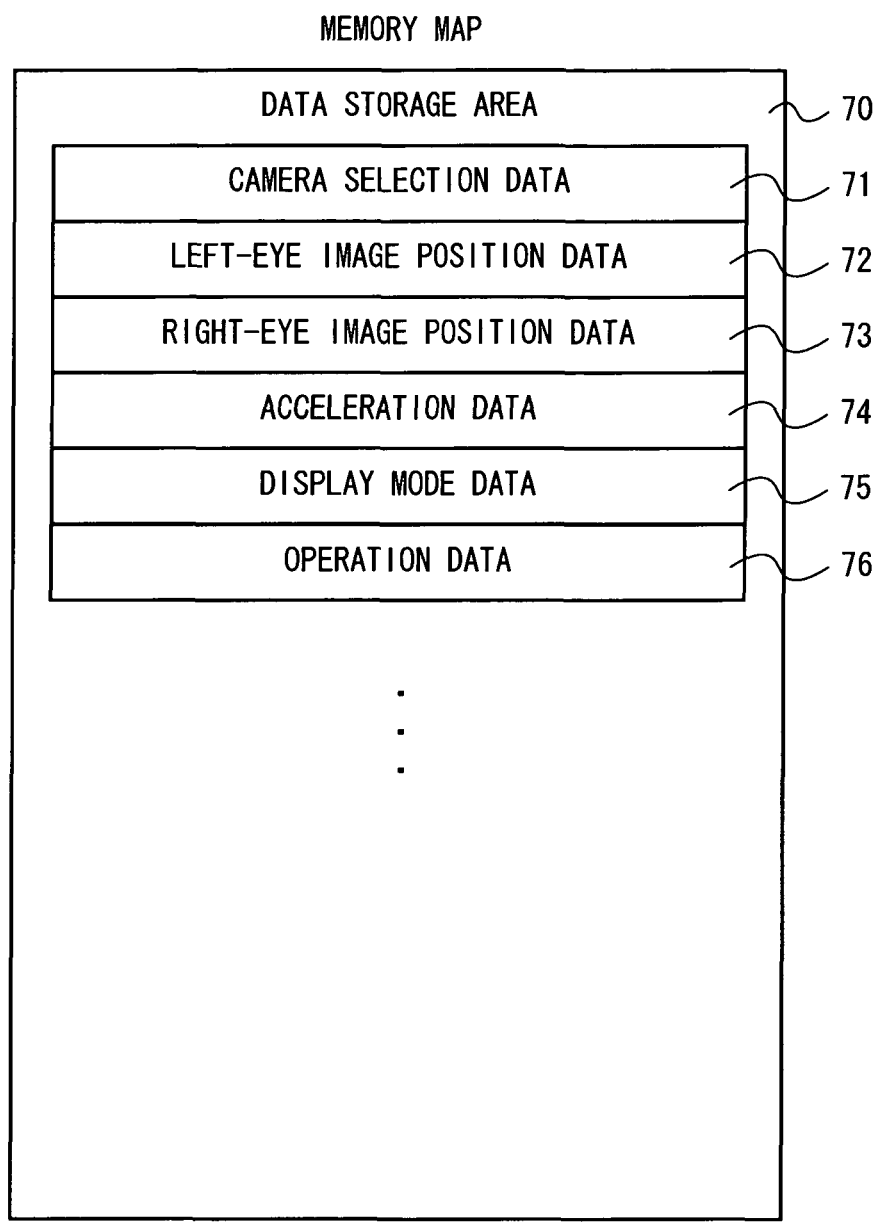
FIG. 12 is a diagram illustrating a memory map of a main memory 32 in the game apparatus 10.

Next, a shooting process according to the present embodiment will be described in detail with reference to FIGS. 12 to 14. First, major data stored in the main memory 32 when the shooting process is performed will be described. FIG. 12 is a diagram illustrating a memory map of the main memory 32 in the game apparatus 10. As shown in FIG. 12, a data storage area 70 is provided in the main memory 32. Stored in the data storage area 70 are camera selection data 71, left-eye image position data 72, right-eye image position data 73, acceleration data 74, display mode data 75, operation data 76, and the like. In addition to these data, a program for executing the above-described shooting process, data indicating a touch position on the touch panel 13, data indicating an image for camera selection, which is displayed on the lower LCD 12, and the like are stored in the main memory 32.

The camera selection data 71 indicates an imaging section which is currently selected. The camera selection data 71 indicates whether the currently selected imaging section is the outer imaging section 23 or the inner imaging section 24.

The left-eye image position data 72 indicates a display position, on the upper LCD 22, of a left-eye image which is taken by the outer imaging section (left) 23a, and indicates coordinates of an image center of the left-eye image. The right-eye image position data 73 indicates a display position, on the upper LCD 22, of a right-eye image which is taken by the outer imaging section (right) 23b, and indicates coordinates of an image center of the right-eye image.

The acceleration data 74 indicates a latest acceleration detected by the acceleration sensor 39. Specifically, the acceleration data 74 indicates accelerations in the x-, y-, and z-axes directions, which are detected by the acceleration sensor 39. The acceleration sensor 39 detects an acceleration once every predetermined period, and transmits the detected acceleration to the information processing section 31 (CPU 311). The information processing section 31 updates the acceleration data 74 in the main memory 32 every time the acceleration sensor 39 detects an acceleration.

The display mode data 75 indicates whether the display mode of the upper LCD 22 is the stereoscopic display mode or the planar display mode.

The operation data 76 indicates operations performed on the respective operation buttons 14A to 14E and 14G to 14H, and the analog stick 15.

Next, the shooting process will be described in detail with reference to FIGS. 13 and 14. FIG. 13 is a main flowchart illustrating the shooting process of the present embodiment. When the game apparatus 10 is powered on, the information processing section 31 (CPU 311) of the game apparatus 10 executes a start-up program stored in a ROM (not shown), and thereby the respective units such as the main memory 32 are initialized. Next, a shooting program stored in the internal data storage memory 35 is read into the main memory 32, and the CPU 311 in the information processing section 31 starts execution of the program. The flowchart shown in FIG. 13 illustrates a process performed by the information processing section 31 (CPU 311 or GPU 312) after completion of the above-described processes. In FIG. 13, process steps that are not directly related to the present invention are omitted. A process loop including steps S1 to S12 shown in FIG. 13 is repeated in every single frame (e.g., 1/30 sec, which is referred to as a frame period).

First, in step S1, the information processing section 31 determines whether or not an imaging section switching instruction is issued. For example, icons indicating the outer imaging section 23 and the internal imaging section 24 are displayed on the screen of the lower LCD 12. The information processing section 31 determines whether or not an imaging section switching instruction is issued, based on a touch position detected by the touch panel 13. Specifically, when a touch position is detected, the information processing section 31 determines that an imaging section switching instruction is issued if the touch position is the display position of the icon of the imaging section that is different from the currently selected imaging section. For example, assuming that the outer imaging section 23 is currently selected, if the touch position detected by the touch panel 13 is the display position of the icon of the internal imaging section 24, the information processing section 31 determines that an imaging section switching instruction is issued. When the result of the determination is positive, the information processing section 31 executes a process of step S2. On the other hand, when the result of the determination is negative, the information processing section 31 executes a process of step S3. Only an icon for switching to the internal imaging section 24 may be displayed when the outer imaging section 23 is selected, and only an icon for switching to the outer imaging section 23 may be displayed when the internal imaging section 24 is selected. The information processing section 31 may determine that an imaging section switching instruction is issued, when any of the operation buttons 14A to 14E is pressed, instead of an operation on the screen of the lower LCD 12 using the touch panel 13.

In step S2, the information processing section 31 selects an imaging section. Specifically, the information processing section 31 switches the imaging section used for image taking to the imaging section touched in step S1, and updates the camera selection data 71 in the main memory 32. Next, the information processing section 31 executes a process in step S3.

In step S3, the information processing section 31 obtains a taken image. Specifically, the information processing section 31 obtains image data indicating an image taken by the currently selected imaging section, and stores the image data in the VRAM 313. For example, when the outer imaging section 23 is selected, the information processing section 31 obtains a right-eye image and a left-eye image which are taken by the outer imaging section 23. When the internal imaging section 24 is selected, the information processing section 31 obtains an image taken by the internal imaging section 24. Next, the information processing section 31 executes a process in step S4.

In step S4, the information processing section 31 detects an orientation of the game apparatus 10. Specifically, the information processing section 31 detects an orientation of the game apparatus 10 relative to the horizontal direction, with reference to the acceleration data 74 stored in the main memory 32. More specifically, the information processing section 31 detects an orientation of the game apparatus 10 based on the value of the acceleration in the x axis direction among the accelerations in the three-axis directions, which have been detected by the acceleration sensor 39.

Figure 15A:
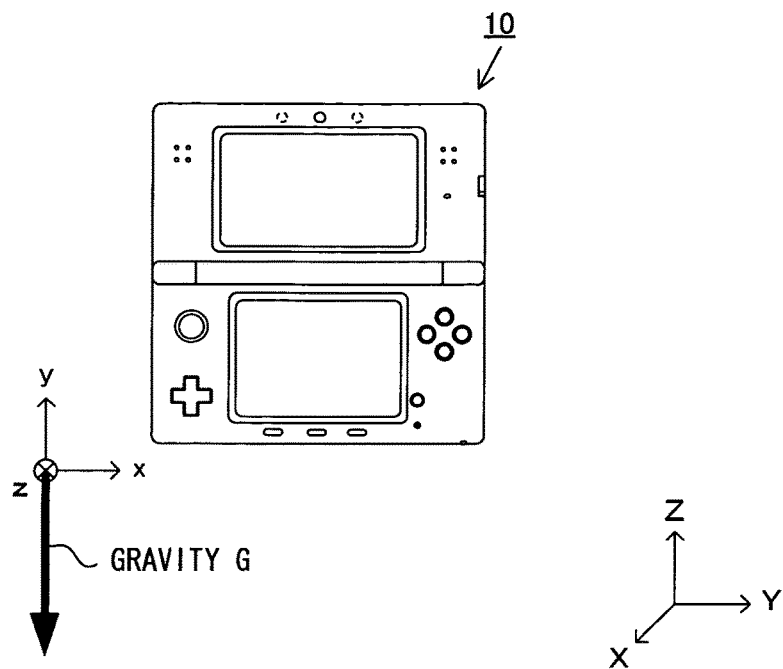
FIG. 15A is a diagram illustrating a state in which the game apparatus 10 is not inclined relative to the horizontal direction.
Figure 15B:
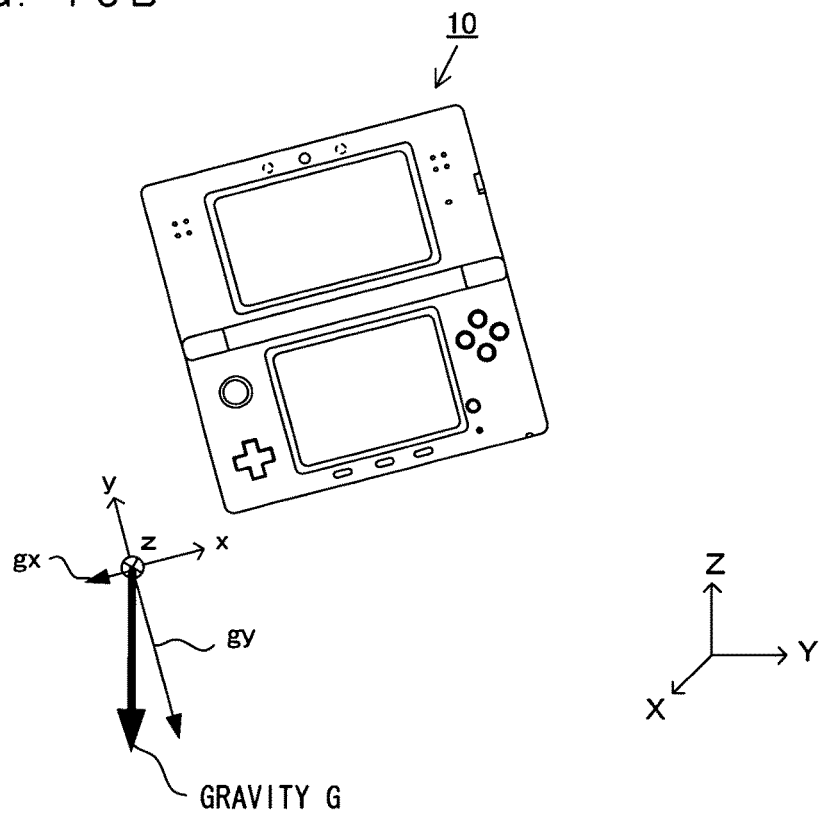
FIG. 15B is a diagram illustrating a state in which the game apparatus 10 is inclined relative to the horizontal direction (inclined to the left)

FIGS. 15A and 15B are diagrams illustrating detection of an orientation of the game apparatus 10. FIG. 15A shows a state where the game apparatus 10 is not inclined relative to the horizontal direction. FIG. 15B shows a state where the game apparatus 10 is inclines relative to the horizontal direction (inclined to the left). In FIGS. 15A and 15B, an XYZ-coordinate system is a space coordinate system fixed in the space, and an xyz-coordinate system is an object coordinate system fixed in the game apparatus 10. The negative direction of the Z axis is the gravity direction. As shown in FIG. 15A, when the game apparatus 10 is in a static state without being inclined relative to the horizontal direction, the acceleration sensor 39 detects the gravity. Specifically, the acceleration in the y-axis direction, which is detected by the acceleration sensor 39, is −G (G: the magnitude of gravity acceleration), and the values of accelerations in the x-axis direction and the z-axis direction are zero. On the other hand, as shown in FIG. 15B, when the game apparatus 10 is in a static state while being inclined relative to the horizontal direction (lateral direction), the gravity acceleration is detected as an acceleration gx of an x-axis direction component and an acceleration gy of a y-axis direction component. Specifically, when the game apparatus 10 is in a static state while being inclined relative to the horizontal direction, the acceleration in the x-axis direction, which is detected by the acceleration sensor 39, indicates a value that is not zero. Accordingly, the game apparatus 10 can learn the degree of inclination of the game apparatus 10, based on the magnitude of acceleration in the x-axis direction.

In FIGS. 15A and 15B, even when the game apparatus 10 is inclined in the front-rear direction, that is, even when the game apparatus 10 is rotated about the x axis, inclination of the game apparatus 10 relative to the horizontal direction is detected by using only the value of the acceleration in the x-axis direction. Even when the game apparatus 10 is rotated about the x axis, if the game apparatus 10 is not rotated about the z axis (not rotated relative to the horizontal direction), the imaging direction of the outer imaging section 23 is merely varied in the up-down direction in the space, which does not adversely affect display of the above-described stereoscopic image.

Further, the acceleration sensor 39 detects an acceleration other than the gravity acceleration, in accordance with the movement of the game apparatus 10. For example, when the game apparatus 10 is intentionally shaken by the user, the game apparatus 10 cannot accurately determine the direction of the gravity acceleration. In this case, the magnitude of the acceleration detected by the acceleration sensor 39 is greater (or smaller) than the magnitude of the gravity acceleration. Accordingly, when the magnitude of the detected acceleration is greater than the magnitude of the gravity acceleration by a predetermined threshold, it is not necessary to detect the orientation of the game apparatus 10. Even when the game apparatus 10 is not intentionally shaken by the user, the game apparatus 10 slightly moves and therefore detects an acceleration other than the gravity acceleration. In this case, however, accelerations detected during a predetermined period are averagely equal to the gravity acceleration. Therefore, an orientation of the game apparatus 10 may be detected based on the accelerations detected during the predetermined period.

Step S4 is followed by step S5. In step S5, the information processing section 31 determines whether or not the outer imaging section 23 is selected. Specifically, the information processing section 31 determines whether or not the currently selected imaging section is the outer imaging section 23, with reference to the camera selection data 71. When the result of the determination is positive (when the outer imaging section 23 is selected), the information processing section 31 executes a process of step S6. On the other hand, when the result of the determination is negative, the information processing section 31 executes a process of step S9.

In step S6, the information processing section 31 determines whether or not the slider 25a of the 3D adjustment switch 25 is positioned at the lowermost position. The information processing section 31 determines whether or not the slider 25a is positioned at the lowermost position, based on a signal from the 3D adjustment switch 25. When the result of the determination is negative, the information processing section 31 causes the 3D indicator 26 to light up, and then executes a process in step S7. On the other hand, when the result of the determination is positive, the information processing section 31 turns off the 3D indicator 26, and then executes a process of step S9.

In step S7, the information processing section 31 adjusts the positions of the right-eye image and the left-eye image. Specifically, the information processing section 31 updates the display positions of the right-eye image and the left-eye image, which are obtained in step S3, in the horizontal direction (the left-right direction of the upper LCD 22) in accordance with the position of the slider 25a of the 3D adjustment switch 25. More specifically, the information processing section 31 updates, according to the position of the slider 25a, the left-eye image position data 72 and the right-eye image position data 73 so that the left-eye image and the right-eye image move leftward and rightward, respectively, by a predetermined distance. Since the left-eye image position data 72 and the right-eye image position data 73 are thus updated in step S7, the left-eye image and the right-eye image are displayed in the adjusted positions when executing step S10 (step S23) described later. The amount of movement (the amount of shift) of the left-eye image and the right-eye image is determined according to the position of the slider 25a. When the slider 25a is present at the second position (see FIG. 6C), the amount of shift between the left-eye image and the right-eye image has a maximum value. The amount of shift between the left-eye image and the right-eye image means a shift, in the horizontal direction, between the display position of the left-eye image and the display position of the right-eye image. That is, it means a difference, in the horizontal direction (x direction), between the coordinate value of the center of the left-eye image and the coordinate value of the center of the right-eye image. When the slider 25a is present at the first position (see FIG. 6B), the amount of shift between the left-eye image and the right-eye image is zero. In this way, in step S7, the amount of shift, in the horizontal direction, between the display position of the right-eye image and the display position of the left-eye image is determined according to the position of the slider 25a of the 3D adjustment switch 25. After the process of step S7, the information processing section 31 executes a process in step S8.

In step S8, the information processing section 31 updates the display mode data 75 to set the display mode of the upper LCD 22 to the stereoscopic display mode (3D display mode). Next, the information processing section 31 executes a process in step S10.

On the other hand, in step S9, the information processing section 31 updates the display mode data 75 to set the display mode of the upper LCD 22 to the planar display mode (2D display mode). The process of step S8 is executed when it is determined in step S5 that the internal imaging section 24 is selected, or when it is determined in step S6 that the display mode is set to the planar display mode by the 3D adjustment switch 25. Next, the information processing section 31 executes a process of step S10.

In step S10, the information processing section 31 executes a display process of the upper LCD 22. The display process in step S9 will be described in detail with reference to FIG. 14. FIG. 14 is a flowchart illustrating the details of the display process (step S10) of the upper LCD 22.

In step S21, the information processing section 31 determines whether or not the display mode of the upper LCD 22 is the planar display mode (2D display mode). Specifically, the information processing section 31 determines whether or not the display mode of the upper LCD 22 is the planar display mode, with reference to the display mode data 75. When the result of the determination is negative, the information processing section 31 executes a process of step S22. On the other hand, when the result of the determination is positive, the information processing section 31 executes a process of step S24.

In step S22, since the display mode of the upper LCD 22 is the stereoscopic display mode, the information processing section 31 sets the parallax barrier of the upper LCD 22 to ON. Specifically, the information processing section 31 transmits, to the LCD controller of the upper LCD 22, a signal to set the parallax barrier to ON. Then, the information processing section 31 executes a process of step S23.

In step S23, the information processing section 31 outputs the left-eye image and the right-eye image to the upper LCD 22. Specifically, the information processing section 31 outputs, to the upper LCD 22, the left-eye image and the right-eye image, the positions of which have been adjusted in step S7. That is, with reference to the left-eye image position data 72 updated in step S7, the information processing section 31 outputs, to the upper LCD 22, the left-eye image so that the left-eye image is displayed in the position indicated by the left-eye image position data 72. Likewise, with reference to the right-eye image position data 73 updated in step S7, the information processing section 31 outputs, to the upper LCD 22, the right-eye image so that the right-eye image is displayed in the position indicated by the right-eye image position data 73. More specifically, the information processing section 31 alternately repeats a process of outputting pixel data of the right-eye image for one line in the vertical direction, and a process of outputting pixel data of the left-eye image for one line in the vertical direction. Thereby, rectangle-shaped images, which are obtained by dividing the right-eye image in the vertical direction, and rectangle-shaped images, which are obtained by dividing the left-eye image in the vertical direction, are alternately arranged to be displayed on the upper LCD 22. In this case, the rectangle-shaped images of the right-eye image and the rectangle-shaped images of the left-eye image are arranged in accordance with the amount of shift between the two images (the difference between the x-direction coordinate values of the respective images, which has been updated in step S7). Since the two images are thus outputted to the upper LCD 22, when the user views the screen of the upper LCD 22 from the front thereof, the right-eye image and the left-eye image are viewed by the user's right and left eyes, respectively, as if the images are displayed in the positions adjusted in step S7.

Figure 16A:
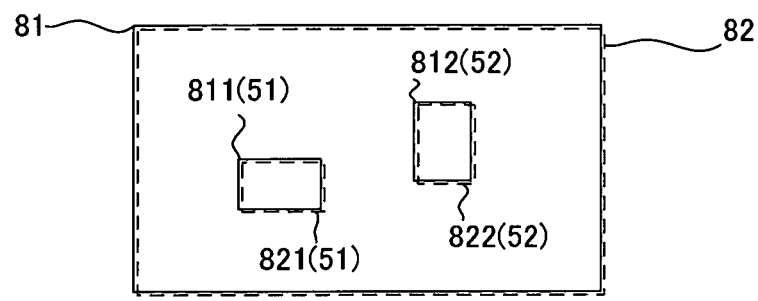
FIG. 16A is a diagram illustrating a positional relationship between a left-eye image and a right-eye image displayed on the upper LCD 22 when an amount of shift between the left-eye image and the right-eye image is zero.
Figure 16B:
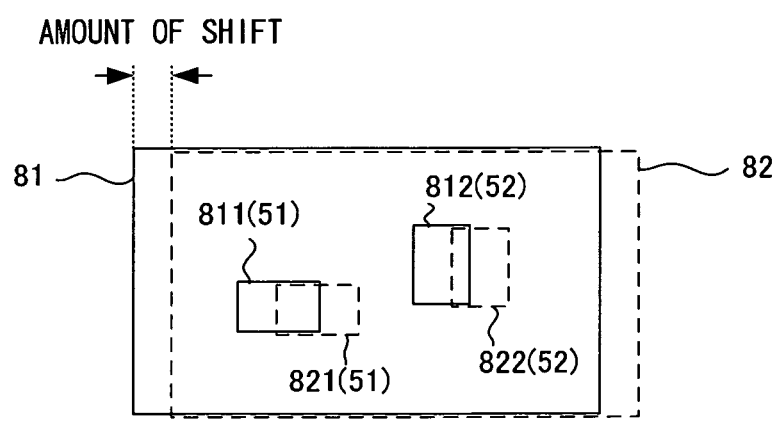
FIG. 16B is a diagram illustrating a positional relationship between a left-eye image and a right-eye image displayed on the upper LCD 22 when an amount of shift between the left-eye image and the right-eye image is set at a maximum value.

FIGS. 16A and 16B are diagrams each illustrating a shift in position between the left-eye image and the right-eye image. FIG. 16A is a diagram illustrating the positional relationship between the left-eye image and the right-eye image, which are displayed on the upper LCD 22, in a case where the amount of shift between the left-eye image and the right-eye image is zero. FIG. 16B is a diagram illustrating the positional relationship between the left-eye image and the right-eye image, which are displayed on the upper LCD 22, in a case where the amount of shift between the left-eye image and the right-eye image is set at a maximum value. In each of FIGS. 16A and 16B, a left-eye image 81 (solid line) and a right-eye image 82 (broken line) are illustrated. The left-eye image 81 includes a taken target image 811 obtained by taking an imaging target 51 existing in the real space, and a taken target image 812 obtained by taking an imaging target 52 existing in the real space. The right-eye image 82 includes a taken target image 821 obtained by taking an imaging target 51 existing in the real space, and a taken target image 822 obtained by taking an imaging target 52 existing in the real space. When the user views the upper LCD 22, on which the left-eye image 81 and the right-eye image 82 are displayed, from the front thereof, the user recognizes a stereoscopic image (an image having 3D appearance, shown in FIG. 10) in which these two images are united. When the left-eye image 81 and the right-eye image 82 are displayed on the upper LCD 22, the left-eye image 81 and the right-eye image 82 are entirely or partially displayed on the upper LCD 22. For example, when the amount of shift between the two images is zero as shown in FIG. 16A, the entire left-eye image 81 and the entire right-eye image 82 may be displayed on the upper LCD 22. Alternatively, parts of the left-eye image 81 and the right-eye image 82, each part corresponding to a predetermined range of a rectangle from the center of the image, may be displayed on the upper LCD 22. When the amount of shift between the two images is set at the maximum value as shown in FIG. 16B, only overlapping portions of the left-eye image 81 and the right-eye image 82 may be displayed on the upper LCD 22. In FIG. 16A, the left-eye image 81 and the right-eye image 82 are slightly shifted in the vertical direction for illustrative purposes, the positions of the two images (the positions of the centers of the images) actually coincide with each other.

When the slider 25a of the 3D adjustment switch 25 is present at the first position (a position slightly higher than the lowermost position) shown in FIG. 6B, the amount of shift between the left-eye image and the right-eye image set at zero as shown in FIG. 16A. When the slider 25a of the 3D adjustment switch 25 is present at the second position (the uppermost position) shown in FIG. 6C, the amount of shift between the left-eye image and the right-eye image is set at the maximum value as shown in FIG. 16B. When the state shown in FIG. 16A and the state shown in FIG. 16B are compared, a manner in which the stereoscopic image is visible differs between FIG. 16A and FIG. 16B. Specifically, in the state shown in FIG. 16B, the imaging target included in the stereoscopic image is viewed as if it is positioned farther from the screen of the upper LCD 22 in the depth direction, than in the state shown in FIG. 16A. For example, when the user feels that the imaging target included in the stereoscopic image is positioned in the vicinity of the screen in the state shown in FIG. 16A, the user feels that the imaging target included in the stereoscopic image is positioned farther from the screen in the depth direction in the state shown in FIG. 16B.

Figure 17A:
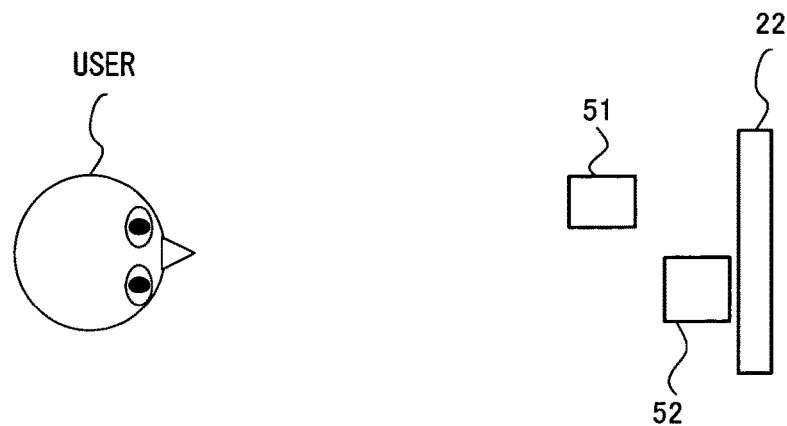
FIG. 17A is a diagram illustrating the positions of imaging targets, which a user feels, when the left-eye image and the right-eye image are displayed on the upper LCD 22 with the positional relationship shown in FIG. 16A.
Figure 17B:
FIG. 17B is a diagram illustrating the positions of the imaging targets, which a user feels, when the left-eye image and the right-eye image are displayed on the upper LCD 22 with the positional relationship shown in FIG. 16B.

FIGS. 17A and 17B are diagrams illustrating a difference in manner in which the stereoscopic image is visible for the user, which depends on the positions where the left-eye image and the right-eye image are displayed. FIG. 17A is a diagram illustrating the positions of the imaging targets, which the user feels, in a case where the left-eye image and the right-eye image are displayed on the upper LCD 22 with the positional relationship shown in FIG. 16A. FIG. 17B is a diagram illustrating the positions of the imaging targets, which the user feels, in a case where the left-eye image and the right-eye image are displayed on the upper LCD 22 with the positional relationship shown in FIG. 16B. FIGS. 17A and 17B are diagrams each illustrating the positional relationships among the user, the upper LCD 22, and the imaging targets 51 and 52, which the user feels when he/she views the stereoscopic image. As shown in FIG. 17A, when the left-eye image and the right-eye image are in the positional relationship shown in FIG. 16A, the user feels as if the imaging targets 51 and 52 included in the stereoscopic image are positioned in front of the screen of the upper LCD 22. On the other hand, as shown in FIG. 17B, when the left-eye image and the right-eye image are in the positional relationship shown in FIG. 16B, the user feels as if the imaging targets 51 and 52 included in the stereoscopic image are positioned farther from the screen of the upper LCD 22 in the depth direction, than in the case shown in FIG. 17A. In this way, the positions of the imaging targets included in the stereoscopic image, which the user feels, vary with variation in the display positions of the left-eye image and the right-eye image in the horizontal direction. Accordingly, the user can vary the manner in which the images taken by the outer imaging section 23 are visible, in accordance with the position of the slider 25a of the 3D adjustment switch 25.

Figure 14:
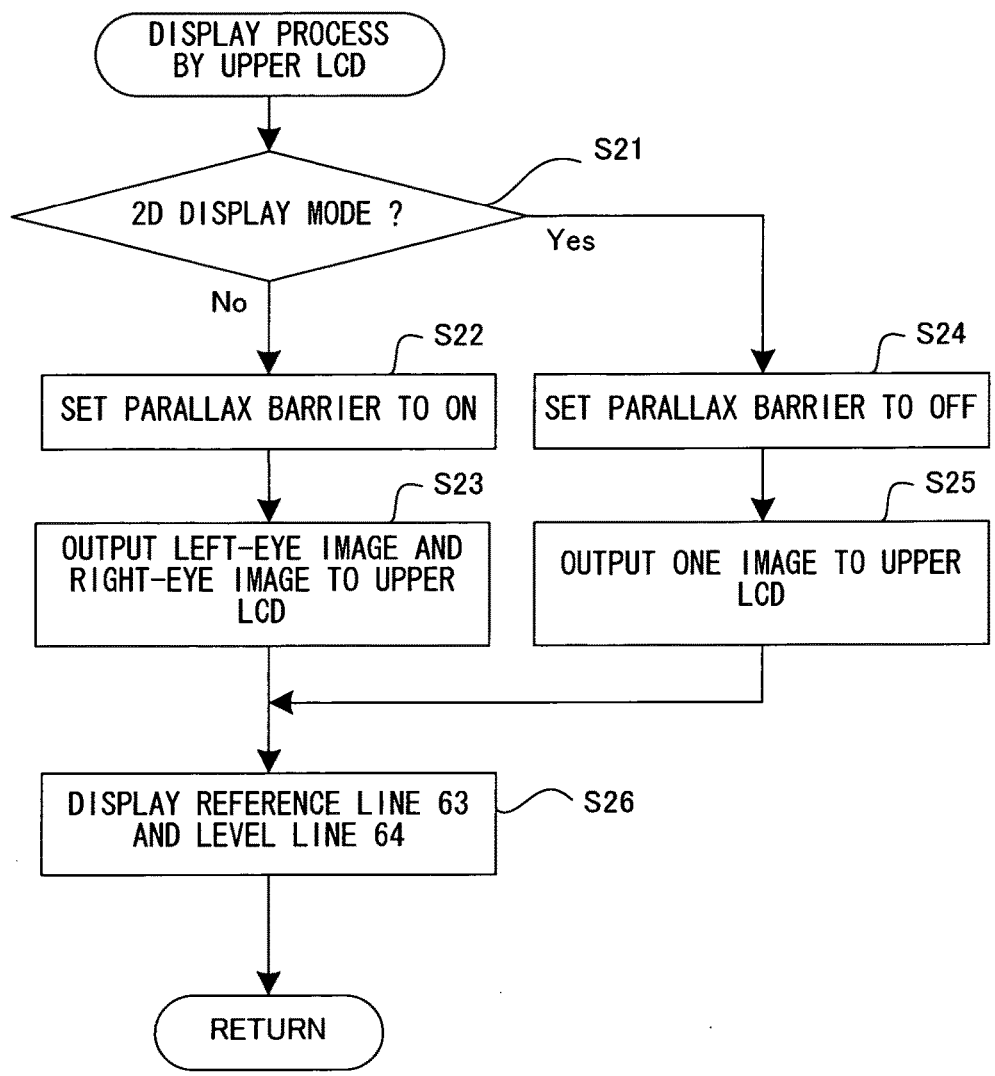
FIG. 14 is a flowchart illustrating in detail a display process (step S9) in the upper LCD 22.

Turning to FIG. 14, when the result of the determination in step S21 is positive, a process of step S24 is executed.

In step S24, the information processing section 31 sets the parallax barrier of the upper LCD 22 to OFF because the display mode of the upper LCD 22 set to the planar display mode. Specifically, the information processing section 31 transmits, to the LCD controller of the upper LCD 22, a signal to set the parallax barrier to OFF. Then, the information processing section 31 executes a process of step S25.

In step S25, the information processing section 31 outputs one image to the upper LCD 22. Specifically, when the internal imaging section 24 is selected, the information processing section 31 outputs, to the upper LCD 22, an image taken by the internal imaging section 24 (the image obtained in step S3). When the outer imaging section 23 is selected, the information processing section 31 outputs, to the upper LCD 22, one of two images taken by the outer imaging section 23. Thereby, the image taken by the outer imaging section 23 or the internal imaging section 24 is planarly displayed on the upper LCD 22. Then, the information processing section 31 executes a process of step S26.

In step S26, the information processing section 31 causes the upper LCD 22 to display a reference line 63 and a level line 64. Specifically, the information processing section 31 causes the upper LCD 22 to display a horizontal reference line 63a which extends through the center of the screen of the upper LCD 22 and is parallel to the horizontal direction of the screen of the upper LCD 22, and a vertical reference line 63b which extends through the center of the screen of the upper LCD 22 and is parallel to the vertical direction of the screen of the upper LCD 22. Further, the information processing section 31 causes the upper LCD 22 to display a level line 64 having an inclination according to the orientation of the game apparatus 10, which has been detected in step S5.

When the user views the reference line 63 and the level line 64, the position, in the depth direction, of the screen of the upper LCD 22 in which the reference line 63 and the level line 64 are displayed, is substantially equal to the position of the screen. That is, when the user views the upper LCD 22, the user feels that the reference line 63 and the level line 64 are displayed on the screen of the upper LCD 22 shown in FIG. 17A or FIG. 17B. Specifically, the reference line 63 and the level line 64, which are superimposed on the left-eye image, and the reference line 63 and the level line 64, which are superimposed on the right-eye image, are displayed in the same position on the screen of the upper LCD 22. Even when the positions of the imaging targets included in the left-eye image and the right-eye image taken by the outer imaging section 23 are moved toward the user or in the depth direction from the screen by adjusting these images using the 3D adjustment switch 25, the positions of the reference line 63 and the level line 64 in the direction vertical to the screen are not changed. In this way, even when the positions of the left-eye image and the right-eye image taken by the outer imaging section 23 are adjusted by the 3D adjustment switch 25, the reference line 63 and the level line 64 are constantly displayed on the screen.

As is apparent from the flowchart shown in FIG. 14, the reference line 63 and the level line 64 are displayed also when the 2D display mode is selected. That is, the reference line 63 and the level line 64 are displayed when a planar image is taken by using the internal imaging section 24 as well as when a stereoscopic image is taken by using the outer imaging section 23. As described above, when a stereoscopic image is taken by using the outer imaging section 23, the reference line 63 and the level line 64 prevent the stereoscopic image from being taken with the game apparatus 10 being inclined. Since the reference line 63 and the level line 64 are displayed also when a planar image is taken by using the internal imaging section 24, the user can check inclination of the game apparatus and determine a composition of a picture with reference to the inclination.

Figure 13:
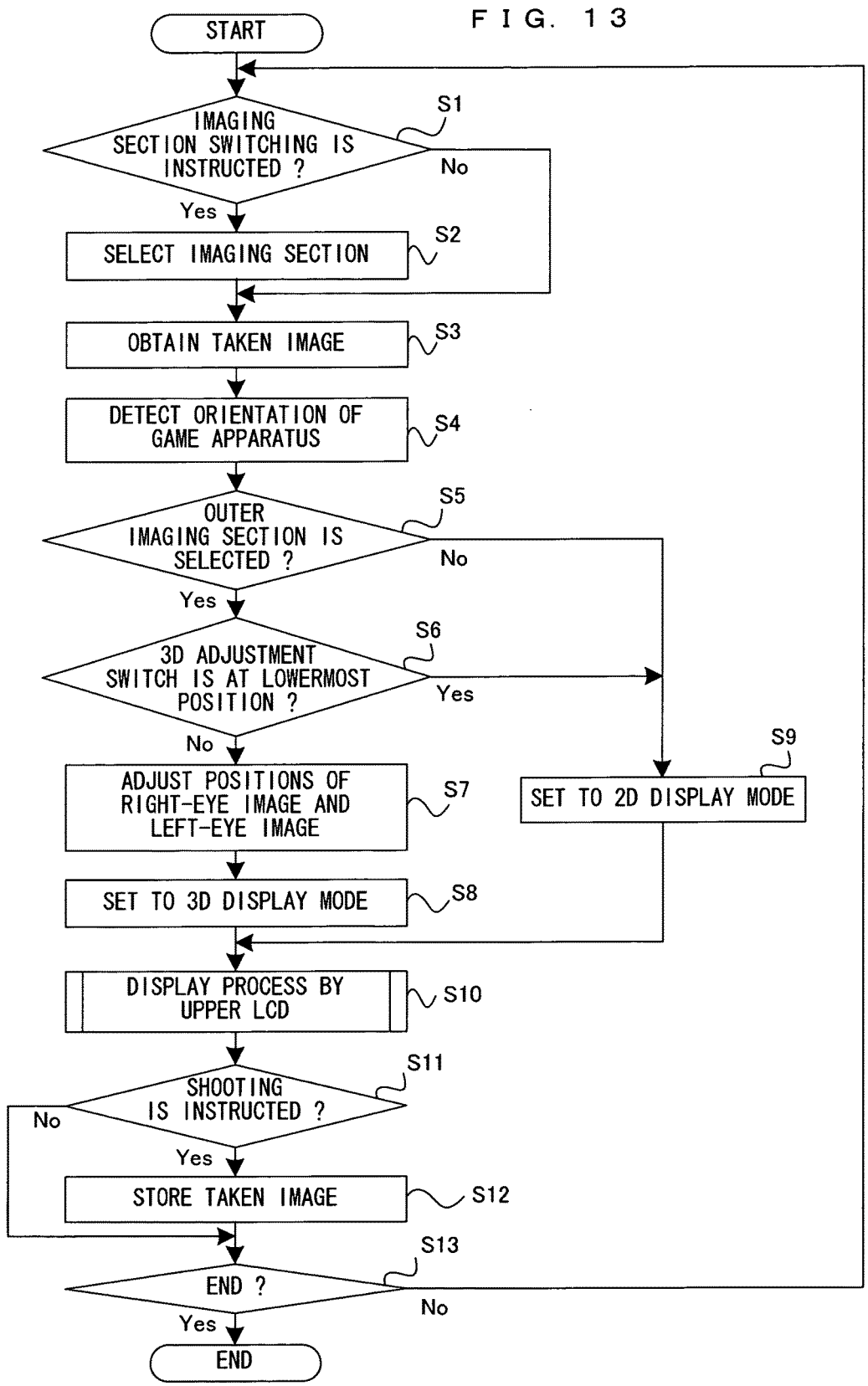
FIG. 13 is a main flowchart illustrating in detail a shooting process of an embodiment.

Then, the information processing section 31 ends the display process of the upper LCD, and executes a process of step S11 shown in FIG. 13.

Turning to FIG. 13, in step S11, the information processing section 31 determines whether or not a shooting instruction is issued. Specifically, the information processing section 31 determines, with reference to the operation data 76, whether or not the shutter button (L button 14G or the R button 14H) is pressed. When the shutter button is pressed, the information processing section 31 determines that a shooting instruction is issued. When the result of the determination is positive, the information processing section 31 executes a process of step S12. When the result of the determination is negative, the information processing section 31 executes a process of step S13.

In step S12, the information processing section 31 stores the taken images obtained in step S3. For example, the information processing section 31 permanently stores, in the internal data storage memory 35 (nonvolatile memory), the two images taken by the outer imaging section 23 or the image taken by the internal imaging section 24. Alternatively, the information processing section 31 temporarily stores, as still images, in the main memory 32 (volatile memory), the two images taken by the outer imaging section 23 or the image taken by the internal imaging section 24. The temporarily stored images are stored in a nonvolatile memory such as the internal data storage memory 35 in accordance with a predetermined instruction from the user (for example, user's pressing a button indicating storage to the nonvolatile memory). When a stereoscopic image is stored, in addition to image data of a right-eye image and a left-eye image, the amount of shift between the positions of these images (the amount of adjustment in step 7) is also stored. When the outer imaging section 23 is selected and the display mode of the upper LCD 22 is set to the 2D display mode (Yes in step S6), only one of the left-eye image and the right-eye image is displayed on the upper LCD 22, but these two images are stored in step S12. When the outer imaging section 23 is selected and the display mode of the upper LCD 22 is set to the 2D display mode, one of the two images taken by the outer imaging section 23 may be stored. Next, the information processing section 31 executes a process of step S13.

In step S13, the information processing section 31 determines whether or not the shooting process is ended. For example, the information processing section 31 determines whether or not the user performs a predetermined operation (for example, whether or not the user presses the select button 14J or the like). When the result of the determination is negative, information processing section 31 executes a process of step S1. When the result of the determination is positive, the information processing section 31 ends the shooting process shown in FIG. 13. Thus, the shooting process according to the present embodiment is ended.

As described above, according to the present embodiment, an image in the direction of the line of sight of a user can be taken as a stereoscopic image by the outer imaging section 23, and the user's face (the direction reverse to the direction of the line of sight of the user) can be taken by the internal imaging section 24.

In the present embodiment, the upper LCD 22 for displaying a stereoscopically visible image (stereoscopic image) is provided on the inner side surface of the upper housing 21, and the lower LCD 12 for displaying an image in a planar manner is provided on the inner side surface of the lower housing 11. The operation buttons 14 and the touch panel 13, which are operated by the user, are provided on the lower housing 11. Thus, the lower housing 11 is configured so as to be held and operated by the user, which allows the user to easily operate the game apparatus 10 and easily view the upper LCD 22 provided on the upper housing 21. Even when the user is operating the game apparatus 10, the user's hand and fingers do not touch the upper LCD 22 on which a stereoscopic image is displayed so as to be visible with naked eyes, the user can easily view the upper LCD 22. When a stereoscopic image is displayed on the upper LCD 22, the user focuses his/her eyes on a position in front of or deeper than the screen of the upper LCD 22, and thus the user recognizes the image displayed on the upper LCD 22 as a stereoscopic image. In this case, if the user's hand or fingers (including other objects) are present in front of or in the vicinity of the screen of the upper LCD 22, it is difficult for the user to focus his/her eyes on the screen. In the game apparatus 10 according to the present invention, however, the lower housing 11 which is held and operated by the user is provided. Therefore, the user's hand and fingers do not touch the upper LCD 22 provided on the upper housing 21, and thus the user can easily focus his/her eyes on the screen.

Further, the outer imaging section 23 (stereo camera) is provided on the outer side surface reverse to the inner side surface of the upper housing 21, and the internal imaging section 24 is provided on the inner side surface of the upper housing 21. The two imaging sections (the outer imaging section (left) 23a and the outer imaging section (right) 23b) of the outer imaging section 23 are aligned so as to be parallel to the horizontal direction of the screen of the lower LCD 12. The internal imaging section 24 is provided at a position reverse of the middle position between the two imaging sections of the outer imaging section 23. The above-described configuration allows the user to take images in the direction of the line of sight of the user, by using the outer imaging section 23, while viewing the screen of the upper LCD 22 from the front thereof. A right-eye image and a left-eye image taken by the outer imaging section 23 are displayed on the upper LCD 22, and the right-eye image and the left-eye image are viewed by the user's right eye and left eye, respectively, through the parallax barrier. Thereby, a stereoscopically visible image is displayed on the upper LCD 22. On the upper LCD 22, the stereoscopic image taken by the outer imaging section 23 is displayed in real time, and the user, who is viewing the stereoscopic image displayed on the screen of the upper LCD 22, can store the stereoscopic image by pressing the shutter button (the L button 14G or the R button 14H). When the user, who is viewing the stereoscopic image displayed on the upper LCD 22 (who is viewing the screen of the upper LCD 22 from the front thereof), selects the internal imaging section 24, the user views the internal imaging section 24 from the front thereof. When the user, who is viewing the internal imaging section 24, presses the shutter button (the L button 14G or the R button 14H) of the imaging section, the user can shoot his/her face from the front thereof (the user can store the image). Accordingly, when the user switches the imaging section from the outer imaging section 23 to the internal imaging section 24, the user can shoot his/her face right from the front without the necessity of moving the position of his/her face to a correct position (a position in front of the internal imaging section 24). It should be noted that selection of the imaging section to be used (the outer imaging section 23 or the internal imaging section 24) may be performed by a selection operation using the respective operation buttons 14A to 14E provided on the lower housing 11.

The area of the screen of the upper LCD 22 is set to be greater than the area of the screen of the lower LCD 12. Specifically, the screen of the upper LCD 22 is horizontally longer than the screen of the lower LCD 12. That is, a rate of the horizontal width in the aspect ratio (horizontal to vertical ratio) of the screen of the upper LCD 22 is set to be greater than a rate of the horizontal width in the aspect ratio of the screen of the lower LCD 12. Thereby, the user's attention can be drawn to the screen of the upper LCD 22. Further, the screen of the lower LCD 12 being greater than the screen of the upper LCD 22 can cause the user to recognize that a manner of holding the game apparatus 10, in which the longitudinal direction of each housing coincides with the horizontal direction (the manner of holding shown in FIG. 8; horizontal holding) is a correct manner of holding the game apparatus 10. That is, when the user holds the game apparatus 10 with the right side surfaces of the lower housing 11 and the upper housing 21 facing downward (with the game apparatus 10 being rotated clockwise at 90° as shown in FIG. 8; vertical holding), the two screens are not bilaterally symmetric, which causes the user to recognize that the horizontal holding is the correct manner of holding.

Further, the resolution of the upper LCD 22 in the horizontal direction is set to be higher than the resolution of the lower LCD 12 in the horizontal direction. Thereby, even when a stereoscopic image is displayed on the upper LCD 22 and a planar image is displayed on the lower LCD 12, the user' attention can be drawn to the upper LCD 22. That is, when the upper LCD 22 and the lower LCD 12 have the same resolution in the horizontal direction, if a stereoscopic image is displayed on the upper LCD 22 while a planar image is displayed on the lower LCD 12, the resolutions of the right-eye image and the left-eye image in the horizontal direction, which are displayed on the upper LCD 22, are reduced as compared to that of the planar image displayed on the lower LCD 12. In this case, the image displayed on the lower LCD 12 becomes clearer than the image displayed on the upper LCD 22, which results in a difficulty in drawing the user's attention to the upper LCD 22.

For example, the resolution of the upper LCD 22 in the horizontal direction may be set to about 1.5 times or more (preferably, two times or more) of the resolution of the lower LCD 12 in the horizontal direction. When a stereoscopic image is displayed on the upper LCD 22, since a right-eye image and a left-eye image are displayed on one screen, the resolution, in the horizontal direction, of the stereoscopic image caused by the right-eye image and the left-eye image is substantially halved. When the upper LCD 22 and the lower LCD 12 have the same resolution in the horizontal direction, the screen of the lower LCD 12 becomes clearer than that of the upper LCD 22. In this case, the user's attention is drawn not to the upper LCD 22 but to the lower LCD 12. However, when the resolution of the upper LCD 22 in the horizontal direction is made higher than that of the lower LCD 12, the user's attention can be drawn to the upper LCD 22 on which a stereoscopic image is displayed.

Further, the lower housing 11 to be held by the user is provided, and the 3D adjustment switch 25 for switching the display mode of the upper LCD 22 is provided on the upper housing 21. Since the 3D adjustment switch 25 is provided on the upper housing 21, it is possible to avoid a situation that the user operates the 3D adjustment switch 25 by mistake while viewing the upper LCD 22 and thereby the display mode of the upper LCD 22 is changed. Since the 3D adjustment switch 25 also has a function of adjusting the distance between the two images in the horizontal direction, it is possible to avoid a situation that the amount of shift between the images is changed by mistake while the user is viewing the upper LCD 22 and thereby the manner in which the stereoscopic image is visible is changed.

Further, the 3D indicator 26 indicating whether or not the upper LCD 22 is in the stereoscopic display mode is provided on the upper housing 21. Thereby, the user can easily determine whether or not the upper LCD 22 is in the stereoscopic display mode. The indicators, other than the 3D indicator 26, for indicating the state of the game apparatus 10, such as the first LED 16A indicating ON/OFF of the power supply and the second LED 16B indicating presence/absence of wireless communication, are provided on the lower housing 11. The indicators other than the 3D indicator 26 may be provided on the outer side surface or the side surface of the upper housing 21, or on any of the inner side surface, the outer side surface, and the side surface of the lower housing 11. That is, the indicators other than the 3D indicator 26 may be provided on a surface different from the inner side surface of the upper housing 21. Thus, the indicators other than the 3D indicator 26 are provided in a position out of the sight of the user when the user views the upper LCD 22 from the front thereof, thereby preventing reduction in the viewability of the stereoscopic image displayed on the upper LCD 22.

(Alternative Embodiments)

Hereinafter, alternative embodiments of the game apparatus 10 will be described. In an another embodiment, while a stereoscopic image is displayed on the upper LCD 22, a user touches the lower LCD 12 (touch panel 13) to designate a position on the upper LCD 22. Specifically, if a touch operation is performed on the touch panel 13 while a stereoscopic image is displayed on the upper LCD 22, a position corresponding to the touch position is displayed on the upper LCD 22. A cursor may be displayed at the designated position on the upper LCD 22. Then, for example, an image is scrolled so that the designated position on the upper LCD 22 comes in the center of the screen. In another example, an amount of shift between a right-eye image and a left-eye image may be adjusted so that the position of an object in the depth direction, which object is displayed at the designated position on the upper LCD 22, is in the vicinity of the display screen.

Figure 18:
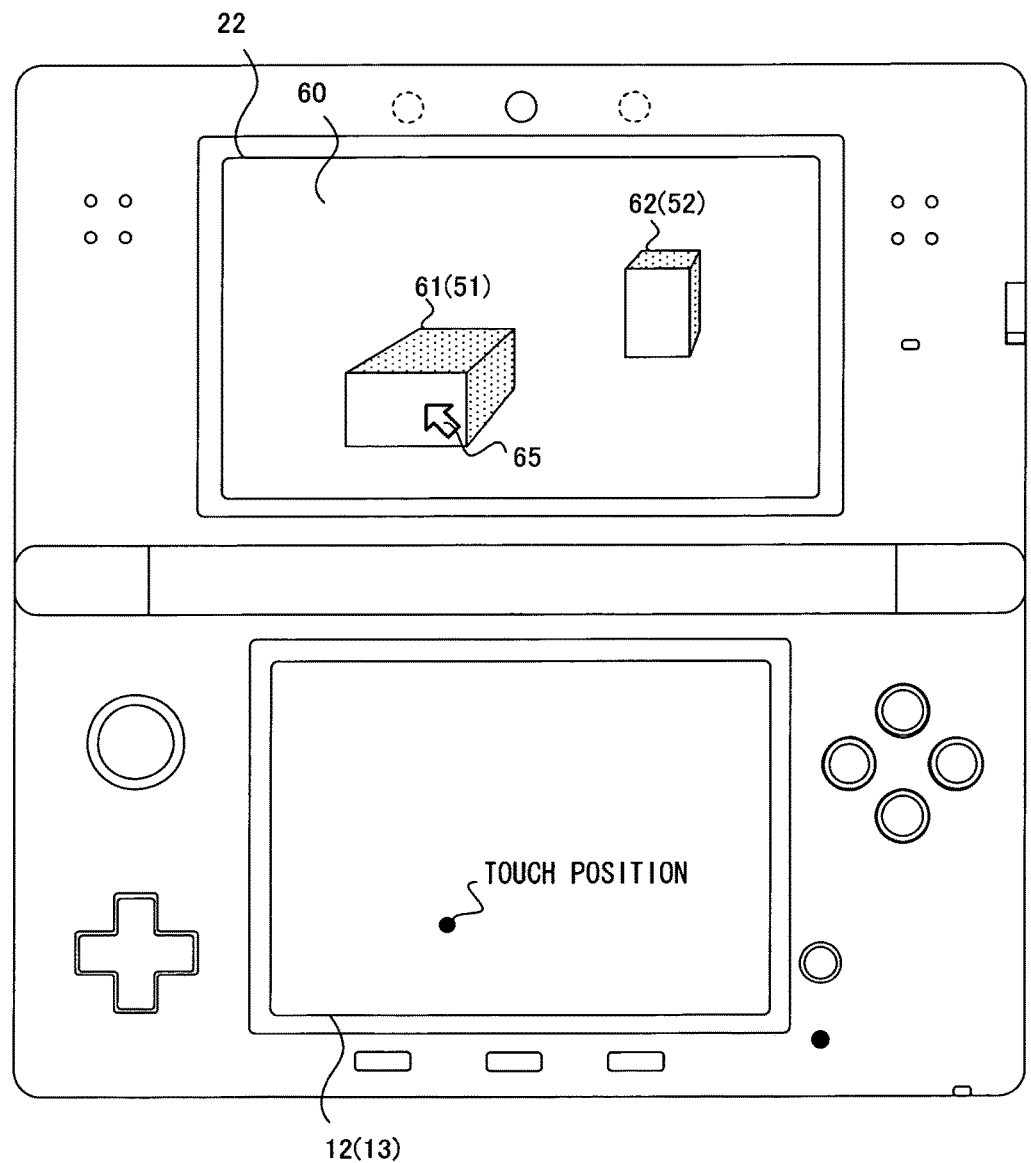
FIG. 18 is a diagram illustrating a state in which a position on the upper LCD 22 is designated by using a touch panel 13.

FIG. 18 shows a state where a position on the upper LCD 22 is designated by using the touch panel 13. In FIG. 18, a stereoscopic image 60 including an imaging target image 61 and an imaging target image 62 is displayed on the upper LCD 22. When a user touches the touch panel 13 with his/her finger or the touch pen 28, the touch panel 13 detects the touch position. As shown in FIG. 18, a cursor 65 is displayed at a position, on the upper LCD 22, corresponding to the touch position. The position, on the upper LCD 22, corresponding to the touch position detected by the touch panel 13 is calculated based on a ratio of the lengths of the two screens in the horizontal direction and a ratio of the lengths of the two screens in the vertical direction. For example, the position on the upper LCD 22 is calculated by using the following formulae:

$$x22 = x12 \cdot A$$

$$y22 = y12 \cdot B$$

where x22 is a coordinate value in the horizontal direction of the upper LCD 22, x12 is a coordinate value in the horizontal direction of the lower LCD 12, y22 is a coordinate value in the vertical direction of the upper LCD 22, y12 is a coordinate value in the vertical direction of the lower LCD 12, A is a ratio of the length of the lower LCD 12 in the horizontal direction to the length of the upper LCD 22 in the horizontal direction, and B is a ratio of the length of the lower LCD 12 in the vertical direction to the length of the upper LCD 22 in the vertical direction.

In this way, a position on the upper LCD 22 is indirectly designated by designating a position on the lower LCD 12 without directly designating the position on the upper LCD 22. Thereby, even when a stereoscopic image is displayed on the upper LCD 22, the user can easily designate the displayed stereoscopic image. That is, when the user tries to directly touch the stereoscopic image, since the user's eyes are not focused on the screen, the user might try to touch the space in front of the screen or a position deeper than the screen. Accordingly, it is difficult for the user to directly designate a position on the upper LCD 22. Further, when the user tries to directly touch the stereoscopic image with his/her finger or the touch pen 28, the finger or the touch pen 28 comes in the sight of the user, which interferes with the user's stereoscopic viewing. However, when the user designates a position on the lower LCD 12 to indirectly designate the corresponding position on the upper LCD 22, the user's stereoscopic viewing is not interfered with, and thus the user can easily designate the position on the upper LCD 22.

For example, when images taken by the outer imaging section 23 and stored are displayed as a stereoscopic image, the stereoscopic image may be scrolled so that a designated position on the upper LCD 22 comes in the center of the screen of the upper LCD 22.

When a stereoscopic image taken by the outer imaging section 23 is displayed in real time, the positions of a right-eye image and a left-eye image in the horizontal direction may be adjusted based on a designated position on the upper LCD 22. For example, in FIG. 18, an imaging target 51 existing at a designated position on the upper LCD 22 is detected by pattern matching or the like from the right-eye image and the left-eye image, and the positions of the right-eye image and the left-eye image in the horizontal direction are adjusted so that the imaging target 51 is displayed on the screen of the upper LCD 22. That is, the positions of taken target images 61 (imaging targets 51) in the horizontal direction, which are respectively included in the right-eye image and the left-eye image, are coincided with each other. Thereby, the user views the stereoscopic image as if the imaging target 51 moves toward the user or in the depth direction from the screen and is positioned in the vicinity of the screen.

In another embodiment, the game apparatus 10 may includes, as orientation detection means, an angular velocity sensor instead of (or in addition to) the acceleration sensor 39. The angular velocity sensor may detect angular velocities around three axes of xyz, or an angular velocity around the z axis. It is possible to calculate an orientation (inclination relative to the horizontal direction) of the game apparatus 10 by the angular velocity sensor. Specifically, an angle of rotation of the game apparatus 10 around the z axis can be calculated by integrating, with time, the angular velocity around the z axis, which is detected by the angular velocity sensor. In this case, initialization of the angular velocity sensor must be performed in a state where the game apparatus 10 is not inclined relative to the horizontal direction.

When the game apparatus 10 includes, as orientation detection means, an acceleration sensor 39 and an angular velocity sensor, an orientation of the game apparatus 10 can be detected more accurately by using an acceleration and an angular velocity. That is, when the game apparatus 10 is in a static state, an orientation of the game apparatus 10 can be accurately detected based on an acceleration detected by the acceleration sensor 39. When the game apparatus 10 is moving (when an acceleration other than a gravity acceleration is generated), an orientation of the game apparatus 10 is detected based on an angular velocity detected by the angular velocity sensor. Detection of an angular velocity by the angular velocity sensor has a certain amount of error, and an error in calculated rotation angle is accumulated with time. However, when the game apparatus 10 is in a static state, an orientation of the game apparatus 10 can be accurately detected based on an acceleration detected by the acceleration sensor 39. Therefore, the rotation angle calculated by the angular velocity sensor in the static state can be initialized. Thus, by using the acceleration sensor 39 and the angular velocity sensor, an orientation of the game apparatus 10 can be detected more accurately regardless of whether the game apparatus 10 is moving or not.

In another embodiment, the game apparatus 10 executes a predetermined game. For example, a predetermined game program is stored in the internal data storage memory 35 or the external memory 44, and a game is performed when the game apparatus 10 executes the program. For example, in this game, an object existing in a 3D virtual space is stereoscopically displayed on the upper LCD 22, and the object moves in the 3D virtual space in accordance with an instruction from the user.

Figure 19:
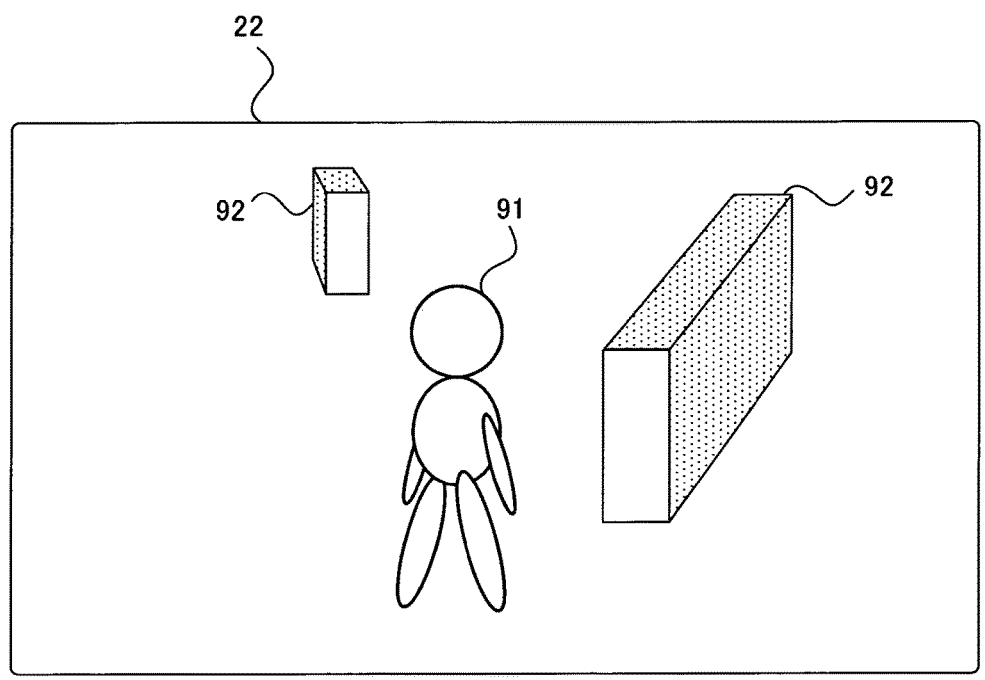
FIG. 19 is a diagram illustrating an example of a game image displayed on the upper LCD 22.

FIG. 19 illustrates an example of a game image displayed on the upper LCD 22. For example, as shown in FIG. 19, a character object 91 and obstacle objects 92 and 93, which exist in a virtual space, are stereoscopically displayed on the upper LCD 22. Specifically, the virtual space and the objects existing in the virtual space are generated by using 3D models such as polygons. Then, images of the virtual space and the objects are taken by using two virtual cameras (virtual stereo camera) which are separated from each other by a predetermined distance in the horizontal direction, thereby generating a right-eye image and a left-eye image. A user moves, by using the analog stick 15, the character object 91 existing in the 3D virtual space while avoiding the obstacle objects 92 and 93. The user can operate the objects in the 3D space more easily by using the analog stick 15 than by using the cross button 14A. Since the analog stick 15 allows the user to designate any direction, the user can move the object in any direction in the 3D virtual space. On the other hand, the cross button 14A allows the user to designate only eight directions (upward, downward, rightward, and leftward directions, and diagonal directions therebetween) fundamentally, and therefore, the user cannot designate a desired direction. Since the analog stick 15 allows the user to designate any direction, the analog stick 15 provides higher operability in the game based on the 3D virtual space than the cross button 14A.

In the game apparatus 10 according to the above-described embodiment, the cross button 14A is provided beneath the analog stick 15, and the lower LCD 12 in which an image is planarly displayed is provided beneath the upper LCD 22. When performing a game in which an image is planarly displayed on the lower LCD 12, not the analog stick 15 but the cross button 14A may be used. Since the game apparatus 10 is provided with the two operation means, the two operation means can be appropriately used between the case where an image is stereoscopically displayed and the case where an image is planarly displayed. Further, since the analog stick 15 is provided at the upper side while the cross button 14A is provided at the lower side, it is suggested to the user that the upper LCD 22 corresponds to the analog stick 15 while the lower LCD 12 corresponds to the cross button 14A.

In the present embodiment, an amount of shift between a left-eye image and a right-eye image is adjusted in accordance with the position of the slider of the 3D adjustment switch 25. In an another embodiment, the 3D adjustment switch 25 may be used for only ON/OFF of stereoscopic display, and an amount of shift between a left-eye image and a right-eye image may be adjusted by a touch operation to the lower LCD 12. For example, when the outer imaging section 23 is selected, if the slider of the 3D adjustment switch 25 is present between the first position and the second position, a left-eye image and a right-eye image, which are taken by the outer imaging section 23, are displayed on the upper LCD 22, and thereby a stereoscopic image is displayed. In this case, for example, an adjustment bar for adjusting the amount of shift between the left-eye image and the right-eye image may be displayed on the lower LCD 12. Then, the user touches a slider of the adjustment bar and slides the slider in a predetermined direction (for example, horizontal direction) to adjust the amount of shift between the left-eye image and the right-eye image. Further, semi-transparent left-eye image and right-eye image may be superimposed on one another and displayed on the lower LCD 12. In this case, since the user can view the left-eye image and the right-eye image with both eyes, the user can easily recognize the positional relationship between the two images. Then, for example, the user may touch and move the left-eye image or the right-eye image to adjust the amount of shift between the two images. Further, in another embodiment, an amount of shift between a left-eye image and a right-eye image may be adjusted in accordance with an operation using the operation buttons 14A to 14E. For example, an amount of shift between a left-eye image and a right-eye image in the horizontal direction may be adjusted when the rightward or leftward direction button of the cross button 14A is pressed.

In the present embodiment, the upper LCD 22 is provided on the inner side surface of the upper housing 21, and the lower LCD 12 is provided on the inner side surface of the lower housing 11. In another embodiment, the upper LCD 22 and the lower LCD 12 may be provided on the outer side surfaces of the respective housings. That is, the upper and lower LCDs 22 and 12 may be configured so that, when the two housings are in their opened states, the surfaces of the housings on which the LCDs are provided face in the same direction.

In the present embodiment, the upper housing 21 and the lower housing 11 are foldable. In another embodiment, the upper housing 21 or the lower housing 11 may be slidable in the vertical direction, and the upper LCD 22 and the lower LCD 12 may be connected to each other in the vertical direction when the housing is slid.

The positions of the operation buttons 14 in the above-described embodiment are merely example, and the operation buttons 14 may be arranged in any way. Further, in the above-described embodiment, since the 3D adjustment switch 25 is provided on the inner side surface of the upper housing 21, the user can visually recognize the 3D adjustment switch 25 even when the user views the upper LCD 22. In another embodiment, the 3D adjustment switch 25 may be provided on the outer side surface or the side surface of the upper housing 21, or it may be provided on the lower housing 11.

In the above-described embodiment, an orientation of the game apparatus 10 is detected by using the acceleration sensor 39 and/or the angular velocity sensor. Then, as shown in FIGS. 10 and 11, a reference line 63 and a level line 64, which indicate the detected orientation, are displayed on the upper LCD 22. In another embodiment, the detected orientation may be informed to the user by using such as sound or vibration of the game apparatus 10. Thereby, the user can know whether or not the game apparatus 10 is inclined relative to the horizontal direction.

In the above-described embodiment, the upper LCD 22 is a parallax barrier type liquid crystal display device, and the parallax barrier is ON/OFF controlled to switch the display mode between the stereoscopic display mode and the planar display mode. In another embodiment, a stereoscopic image and a planar image may be displayed by using, for example, a lenticular type liquid crystal display device. Also in the case of using the lenticular type display device, an image is stereoscopically displayed by vertically dividing two images taken by the outer imaging section 23 into rectangle-shaped images and then alternately arranging the rectangle-shaped images. Also in the case of using the lenticular type display device, an image taken by the internal imaging section 24 is planarly displayed by causing the user to view this image with both eyes. That is, also in the lenticular type liquid crystal display device, the user is caused by view the same image with right and left eyes by vertically dividing the same image into rectangle-shaped images and alternately arranging the rectangle-shaped images. Thus, the image taken by the internal imaging section 24 can be displayed as a planar image.

In another embodiment, the present invention is not limited to a game apparatus, but may be applied to any hand-held electronic device, such as a PDA (Personal Digital Assistant), a mobile phone, a personal computer, a camera, or the like. For example, a mobile phone may be provided with: a display section for displaying a stereoscopically visible image, which is provided on a main surface of a housing; an imaging section provided on the main surface; and a stereo camera provided on a rear surface of the housing, which is reverse to the main surface.

In the above-described embodiment, the information processing section 31 of the game apparatus 10 executes a predetermined program to perform the process steps in the above-described flowcharts. In another embodiment, some or all of the above-described processes may be performed by a dedicated circuit provided to the game apparatus 10.

While the invention has been described in detail, the foregoing description is in all aspects illustrative and not restrictive. It is understood that numerous other modifications and variations can be devised without departing from the scope of the invention.

What is claimed is:

1. A hand-held electronic device comprising:
   a first housing and a second housing that are configured so as to be foldable with respect to each other;
   a stereoscopic display that is integrated into the first housing and configured to display an image which is stereoscopically visible;
   a parallax adjustment portion disposed on either the first or second housing, the parallax adjustment portion physically movable between at least first and second positions so as to adjust a parallax of the stereoscopic display in accordance therewith; and
   a processing system that includes at least one processor, the processing system configured to:
      adjust a distance between two virtual cameras, which are located in a virtual space, in accordance with position of the physically moveable parallax adjustment portion; and
      switch the stereoscopic display to a non-stereoscopic display mode in response to determining the parallax adjustment portion is at the second position.

2. The hand-held electronic device according to claim 1, wherein the second housing is provided with an operation section.

3. The hand-held electronic device according to claim 1, wherein the first housing is provided with a pair of imaging sections capable of stereoscopic shooting.

4. The hand-held electronic device according to claim 3, wherein the pair of imaging sections are arranged so as to be horizontally symmetrical with respect to a center of a screen of the stereoscopic display section.

5. The hand-held electronic device according to claim 1, wherein the first housing is provided with three imaging sections.

6. The hand-held electronic device according to claim 5, wherein two of the three imaging sections are arranged so as to be horizontally symmetrical with respect to a center of a screen of the stereoscopic display section.

7. The hand-held electronic device according to claim 5, wherein one of the three imaging sections is aligned with a center of a screen of the stereoscopic display section in the horizontal direction.

8. The hand-held electronic device according to claim 5, wherein the three imaging sections are aligned along the horizontal direction of the stereoscopic display section.

9. The hand-held electronic device according to claim 5, wherein the three imaging sections are assembled as a single unit, and the unit is housed in a storage section in the first housing.

10. The hand-held electronic device according to claim 5, wherein the three imaging sections are arranged so that the imaging directions of two of the three imaging sections are in the same direction, and the imaging direction of the other one imaging section is reverse to the direction.

11. The hand-held electronic device according to claim 5, wherein two of the three imaging sections enable stereoscopic shooting, and the stereoscopic display section displays a stereoscopic image by using images taken by and outputted from the two imaging sections.

12. The hand-held electronic device according to claim 11, wherein the second housing is provided with a shutter button for stereoscopic shooting.

13. The hand-held electronic device according to claim 12, wherein the shutter button for stereoscopic shooting is provided on both ends of an upper surface of the second housing.

14. The hand-held electronic device according to claim 1, wherein the first housing includes the parallax adjustment portion.

15. The hand-held electronic device according to claim 14, further comprising:
   a plurality of user controls, one of which is the parallax adjustment portion, disposed on the first and second housing,
   wherein the first housing only includes, among the plurality of user controls, the parallax adjustment portion.

16. The hand-held electronic device according to claim 14, wherein the second housing is provided with an analog direction switch.

17. The hand-held electronic device according to claim 1, wherein the second housing is provided with a touch panel.

18. The hand-held electronic device according to claim 17, wherein the stereoscopic display section is not provided with a touch panel function.

19. The hand-held electronic device according to claim 1, wherein the second housing is provided with a touch screen.

20. The hand-held electronic device according to claim 19, wherein the size of the screen of the stereoscopic display section is greater than the size of the touch screen.

21. The hand-held electronic device according to claim 19, wherein an operation section is provided to the right and the left of the touch screen in the second housing.

22. The hand-held electronic device according to claim 1, wherein an operation section is provided on an upper side surface of the second housing.

23. The hand-held electronic device according to claim 1, wherein an operation section is provided on both ends of an upper side surface of the second housing.

24. The hand-held electronic device according to claim 1, wherein the first housing is provided with a light-emitting section for stereoscopic display, which indicates a display mode of the stereoscopic display section.

25. The hand-held electronic device according to claim 24, wherein the first housing includes, as a light-emitting section, only the light-emitting section for stereoscopic display.

26. The hand-held electronic device according to claim 24, wherein the second housing is provided with a light-emitting section for a power supply, which indicates the state of the power supply.

27. The hand-held electronic device according to claim 24, wherein the second housing is provided with a light-emitting section for wireless communication, which indicates the state of wireless communication.

28. The hand-held electronic device according to claim 1, wherein the first housing and the second housing each have a horizontally long shape, and are connected to each other at long side portions thereof, and the stereoscopic display section has a horizontally long screen, and a long side portion of the screen is arranged along the long side portion of the first housing.

29. The hand-held electronic device of claim 1, wherein the parallax adjustment portion adjusts the parallax by producing signals that electronically control positions of pixels of a right-eye image relative to pixels of a left-eye image.

30. The hand-held electronic device of claim 1, wherein the parallax adjustment portion adjusts the parallax by electronically controlling positions of right eye pixels relative to left-eye pixels.

31. The hand-held electronic device of claim 1, wherein the stereoscopic display includes a parallax barrier and the switch to the non-stereoscopic display mode disables the parallax barrier.

32. The hand-held electronic device of claim 1, wherein:
the parallax adjustment portion is physically movable between at least the first position, the second position, and a third position,
movement of the parallax adjustment portion between the first position and the second position causes a switch between the non-stereoscopic display mode and a stereoscopic display mode,
movement to different positions of the parallax adjustment portion between the first position and the third position causes an amount of the parallax to be adjusted in accordance therewith.

33. The hand-held electronic device of claim 32, wherein a protrusion is disposed between the first position and second position and requires application of a predetermined amount of force to move the parallax adjustment portion past the protrusion.

34. A hand-held electronic device comprising:
a housing with a handheld form-factor;
a stereoscopic display integrated into a main surface of the housing and configured to display image(s) in a stereoscopically visible manner;
a pair of imagers provided in the housing and configured for stereoscopic shooting;
a parallax adjustment user control disposed with the housing and including a physically movable member for adjustment by a user between at least a first position and a second position, the parallax adjustment user control configured to send an electrical signal that represents a location of the physically movable member; and
a processing system that includes at least one processor electrically coupled to the parallax adjustment user control, the processing system configured to:
recognize the electrical signal sent from the parallax adjustment user control that represents the location of the physically movable member;
set a distance between two virtual cameras, which are located in a virtual space, as a function of the represented location of the physically movable member; and
in response to a determination that the represented location of the physically movable member is in the first position, instruct the stereoscopic display to switch to a display mode where images displayed by the stereoscopic display are display in a non-stereoscopic manner.

35. The hand-held electronic device of claim 34, wherein the pair of imagers are positioned in a shooting direction that is opposite to a normal direction of the display surface of the stereoscopic display.

36. A hand-held electronic device comprising:
a first housing and a second housing configured so as to be foldable with respect to each other;
a stereoscopic display configured to display image(s) which are stereoscopically visible;
a parallax operation adjustment structure that is movable between at least two different physical positions, wherein, in one of the at least two different physical positions, the stereoscopic display is set to display image(s) in a non-stereoscopic manner, wherein a parallax of the stereoscopic display is adjusted based on the position of the parallax operation adjustment structure; and
a processing system that includes at least one processor, the processing system configured to set a distance between two virtual cameras, which are located in a virtual space, as a function of a position of the parallax operation adjustment structure.

37. The hand-held electronic device of claim 36, wherein the at least two different physical positions includes a first physical position, a second physical position, and a third physical position,
wherein movement of the parallax operation adjustment structure to the third position causes the stereoscopic display to enter a planar display mode that displays the images in the non-stereoscopic manner,
wherein movement of the parallax operation adjustment structure between the first and second physical positions variably adjusts an amount of parallax in accordance with a position of the parallax operation adjustment structure.

38. A hand-held electronic device comprising:
a first housing and a second housing configured to fold with respect to each other;
a first display provided with the first housing, the first display being a stereoscopic display and configured to display an image that is stereoscopically visible;
a second display provided with the second housing;
a parallax adjustment control disposed on either the first or second housing and that is physically movable between at least first and second physical positions so as to adjust a parallax of the stereoscopic display in accordance therewith, the parallax adjustment control configured to generate a signal when located in the first position that is used to switch the first display into a non-stereoscopic mode so that images displayed thereon are displayed in a planar manner; and
a processing system that includes at least one processor, the processing system configured to:
position a first virtual camera in a virtual space;
position a second virtual camera in the virtual space;
adjust at least a position of the first and/or second virtual cameras so that a distance, within the virtual space, between the first and second virtual cameras is adjusted based on concurrent received user input;
generate first and second images of the virtual space based on the first and second virtual cameras; and
output the first and second images for display on the first display.

39. The hand-held electronic device of claim 38, wherein the second display is a touch enabled display.

40. A hand-held electronic device comprising:
a first housing and a second housing that are foldable with respect to each other;
a first display provided with the first housing, the first display being a stereoscopic display and configured to display an image that is stereoscopically visible;

a touch panel provided with the second housing;
a parallax adjustment control disposed on either the first or second housing and that is configured to be physically adjustable between at least first and second positions so as to adjust a parallax of the stereoscopic display in accordance therewith; and
a processing system that includes at least one processor, the processing system configured to:
control the stereoscopic display to display image(s) in a non-stereoscopic manner in response to a determination that the parallax adjustment control is in the first position; and
locate, in a virtual space, a first virtual camera and a second virtual camera at a distance from each other that is a function of a position of the parallax adjustment control.

* * * * *